(12) United States Patent
Ito et al.

(10) Patent No.: US 11,775,660 B2
(45) Date of Patent: Oct. 3, 2023

(54) TRANSMISSION OF DATA USABLE BY OTHERS BASED ON AN APPROPRIATE TIMING AND A TRANSMISSION CONDITION

(71) Applicant: FUJITSU LIMITED, Kawasaki (JP)

(72) Inventors: Hidenobu Ito, Kawasaki (JP); Takuya Sakamoto, Kawasaki (JP); Yosuke Nakamura, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 595 days.

(21) Appl. No.: 16/871,721

(22) Filed: May 11, 2020

(65) Prior Publication Data

US 2020/0364359 A1    Nov. 19, 2020

(30) Foreign Application Priority Data

May 14, 2019 (JP) .................. 2019-091155

(51) Int. Cl.
| | | |
|---|---|---|
| *G06F 21/00* | (2013.01) | |
| *G06F 21/62* | (2013.01) | |
| *G06Q 30/018* | (2023.01) | |
| *G01C 21/36* | (2006.01) | |
| *G07C 5/00* | (2006.01) | |

(Continued)

(52) U.S. Cl.
CPC ......... *G06F 21/62* (2013.01); *G01C 21/3679* (2013.01); *G06Q 30/0185* (2013.01); *G06Q 30/0266* (2013.01); *G07C 5/008* (2013.01); *H04L 63/0428* (2013.01)

(58) Field of Classification Search
CPC . G06F 21/62; G06F 21/6218; G01C 21/3679; G01C 21/3407; G06Q 30/0185; G06Q 30/0266; G07C 5/008; H04L 63/0428; H04L 63/0807; G07B 15/00; H04W 12/104; H04W 4/025; H04W 4/44; H04W 12/06

See application file for complete search history.

(56) References Cited

U.S. PATENT DOCUMENTS 9,401,911 B2 * 7/2016 Castelnuovo ....... H04L 63/0823
9,633,485 B2 * 4/2017 Rufo Torres ......... H01Q 1/2208

(Continued)

FOREIGN PATENT DOCUMENTS

| JP | H11-328254 A | 11/1999 |
|---|---|---|
| JP | 2003-006160 A | 1/2003 |
| JP | 2003-242124 A | 8/2003 |

*Primary Examiner* — Kendall Dolly
(74) *Attorney, Agent, or Firm* — Fujitsu Patent Center

(57) ABSTRACT

An apparatus receives data access parameters from an external device of a transmission destination, where the data access parameters includes an access ticket, a transmission condition to transmit data, and information on the transmission destination of the data, and the access ticket includes a first program accessible to the data whose utilization by others is authorized by a user. The apparatus generates a notice object corresponding to the information on the transmission destination, and transmits the notice object to the transmission destination. The apparatus executes the first program of the access ticket to acquire the data when the transmission condition is satisfied, and transmits the acquired data to the transmission destination to set the acquired data in the notice object.

19 Claims, 32 Drawing Sheets

(51) Int. Cl.
H04L 9/40 (2022.01)
G06Q 30/0251 (2023.01)

(56) References Cited

U.S. PATENT DOCUMENTS

| | | | |
|---|---|---|---|
| 2012/0210123 A1* | 8/2012 | Castelnuovo | H04L 63/0823 |
| | | | 713/156 |
| 2014/0310277 A1* | 10/2014 | Ricci | H04W 76/11 |
| | | | 707/736 |
| 2016/0019729 A1* | 1/2016 | Rufo Torres | H01Q 1/3291 |
| | | | 701/31.5 |
| 2017/0006034 A1* | 1/2017 | Link, II | H04L 63/08 |
| 2019/0213684 A1* | 7/2019 | Sundar Singh | H04W 4/42 |

* cited by examiner

FIG. 11

```
RENTAL CAR USAGE PROCEDURE: TICKET ISSUING SCREEN FOR
              RECOMMENDED INFORMATION
``` http://rentacar.example.com/rentacar?userid=user0001&staus=2

ISSUED TICKET TO ACQUIRE YOUR DRIVING CONDITIONS.
YOU MAY RECEIVE BENEFITS SUCH AS DISCOUNT SERVICE BY
RELEASING DRIVING CONDITIONS OF RENTAL CAR TO SHOP OR
FACILITIES ON ROUTE.
IF YOU WISH TO RECEIVE BENEFIT, CHECK FOLLOWING NOTIFICATION
CONDITION AND PRESS ISSUE BUTTON OF DRIVING CONDITION
ACQUISITION TICKET.

● NOTIFY WHEN COMING CLOSE TO SHOP OR FACILITIES
● NOTIFY WHEN FEELIING TIRED
◎ NOTIFY ALL INFORMATION

[ ISSUE TICKET ]          [ DO NOT ISSUE TICKET ]

FIG. 12A

```
{
"userid":"user0001",
"credential":"
QUNFRTlDNTUKMDU4RkVGNzMKRTBCQzlDNDcKRTVDOEQxN0YKRUM
4QjRBNDUKMzgzODU4NTgKRjE0MDUxOTcKNEI5NDg2QTAKNjQ1NjRD
OTgKMjQ5NTBBMkI=",
"type": "promise",
"data": "drivedata",
"duration": "5 minute",
"condition": {"key":["to_destination", "acceleration_level"]}
}
```

FIG. 12B

```
{
 "header":{"url":"http://rentacar.example.com/processTicket",
  "ticketid":" e909407a-6e67-48a8-bafa-dcbe72e2f75a",
  "start":" 2019-03-01 09:00:00",
  "end":" 2019-03-03 19:00:00",
  "metadata": {"interval":"5 minute"}},
  "description": "drivedata"},
 "payload":
"dmFyIG15c3FsID0gcmVxdWlyZSjigJhteXNxbOKAmSk7CnZhciBjb25uZ
WN0aW9uID0gbXlzcWxjcmVhdGVDb25uZWN0aW9uKHsICBob3N0OiAi
DigJhsb2NhbGhvc3TigJksCiAgdXNlcjog4oCYZGJ1c2Vy4oCZLAogIHBhc3
N3b3JkOiDigJh4eHh4eHjigJksCiAgZGF0YWJhc2U6IOKAmGNhcl9zZXJ2a
WNl4oCZCn0pOwpjb25uZWN0aW9uLmNvbm5lY3QoKTsKY29ubmVjdG
lvbi5xdWVyeSjigJxTRUxFQ1QgKiBGUk9NIGRyaXZlX2RhdGEgV0hFUkUg
Y2FyaWQgPSDigJhjYXIwMDAx4oCZIEFORCBub3coKSBCRVRXRUVOIG5v
dygpKyBpbnRlcnZhbCDigJg1IG1pbnV0ZXPigJk74oCdLCBmdW5jdGlvbihl
cnIsIHJvd3MsIGZpZWxkcyl7c2VuZF9kYXRhKHJvd3MpO30pCg==",
  "condition": {"key":["to_destination", "acceleration_level"]},
  "signature":"dsFGs0712...H32MsZbm"
}
```

FIG. 13

```
var mysql = require('mysql');
var connection = mysql.createConnection({
  host: 'localhost',
  user: 'dbuser',
  password: 'xxxxxx',
  database: 'rentacar'
});
connection.connect();
connection.query("SELECT * FROM drive_data WHERE carid =
'car0001' AND now() BETWEEN now()+ interval '5 minutes';",
function(err, rows, fields){send_data(rows);})
```

FIG. 15

RENTAL CAR USAGE PROCEDURE: TICKET REGISTRATION http://rentacar.example.com/rentacar?userid=user0001&staus=3

ISSUED TICKET TO ACQUIRE YOUR DRIVING CONDITIONS.
FOLLOWING INFORMATION IS PROVIDED TO SHOP OR FACILITIES
ON ROUTE.

· CAR POSITION INFORMATION
· ACCELERATOR AND BRAKE OPERATION AMOUNT
· ...

DO YOU AGREE TO PROVIDE THIS INFORMATION AND PERFORM
TICKET DISTRIBUTION REGISTRATION?

REGISTER TICKET          DO NOT REGISTER TICKET

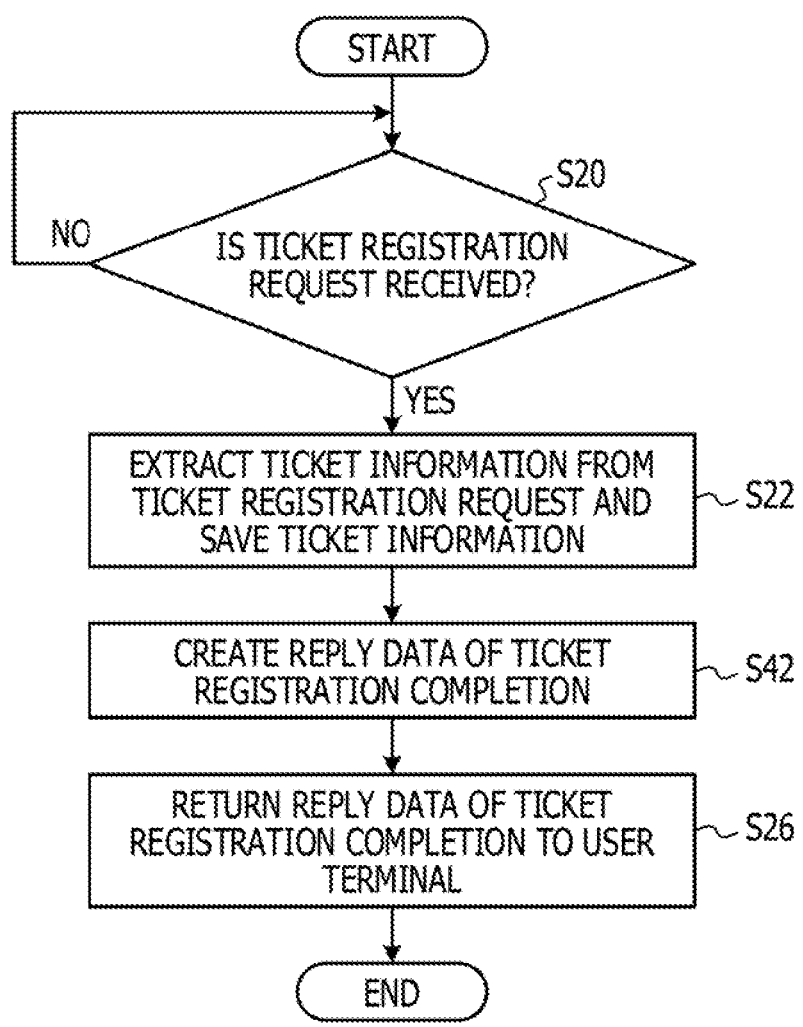

FIG. 18

| SHOP ID | SHOP NAME | POSITION INFORMATION | TICKET ACCEPT URL | SHOP TYPE |
|---|---|---|---|---|
| 1 | Shop1 | 35.6536054,139.6804702 | http://shop1.example.com/getTicket | RESTAURANT |
| ... | ... | ... | ... | ... |

FIG. 20

```
1.   app.use(bodyParser.json());
2.   app.post('/callback550e8400d42397e88a76b32c', function(req, res) {
3.    // get drivedata
4.    var drivedata = req.body.get(objectid);
5.    // analyze drivedata
6.    function() {...};
7.    // call transferMessage if match condition.
8.    if (matchConditon()) {
9.    var postData = {"from": "shop1","message": "10% DISCOUNT OF
            EXCLUSIVE LUNCH",
      "image":"MDEyMzQ1Njc4OWFiY2RlZmdoaWprb...G1ub3BxcnN0dXZ3e
      HI6QUJDREVGR0hJSktMTU5PUFFSU1RVVldYWVo="
10.   };
11.   var postDataStr = JSON.stringify(postData);
12.   var req = http.request(options, (res) => {...});
13.   req.write(postDataStr);
14.   req.end();
15.   }
16.   });
```

FIG. 21

```
{
"ticket":"
ewogIOKAnGhlYWRlcuKAnTp74oCcdXJs4oCdOuKAnWh0dHA6Ly9yZW50YWNhci
5leGFtcGxlLmNvbS9wcm9jZXNzVGlja2V4oCdLAogICAg4oCcdGlja2V0aWTigJ064
oCdlGU5MDk0MDdhLTZlNjctNDhhOC1iYWZhLWRjYmU3MmUyZjc1YeKAnSwKICA
gIOKAnG1ldGFkYXRh4oCdOiB74oCcaW50ZXJ2YWzigJ064oCdNSBtaW51dGXigJ19f
SwKICAgIOKAnGRlc2NyaXB0aW9u4oCdOiDigJxkcml2ZWRhdGHigJ19fSwKIOKAnH
BheWxvYWTigJ06IOKAnGRtRnlJRzE1YzNGc0lEMGdjbVZ4ZFdseVpTamlnSmh0ZVh
OeGJPS0FtU2s3Q25aaGNpQmpiMjV1WldOMGFXOXVJRDBnYlhsemNXeGpjbVZoZ
EdWRGlyNXVaV04wYVc5dUtlc0tJQ0JvYjNOME9pRGlnSmhzYjJOaGJHaHZjM1RpZ
OprcONpQWdkWE5sY2pvZzRvQ1laR0oxYzJWeTRvQ1pMQW9nSUhCaGMzMzTjNiMO
prT2lEaWdKaDRlSGg0ZUhqaWdKa3NDaUFnWkdGlXSmhjMlU2SU9LQW1HTm
hjbDl6WlhKMmFXTmw0bONaQ24wcE93cGpiMjV1WldOMGFXOXVMbU52Ym01b
FkzUW9LVHNLWTl5dWJtVmpkR2x2Ymk1eGRXVnllU2ppZ0p4VFJVeEZRMVFFnS2lC
R1VrOU5JR1J5YVhabFlgyUmhkR0VnVjBoRlVrVWdZMkZ5YVdZ1BTRGlnSmhqWV
hjd01EQXg0b0NaSUVGT1JDQnViM2NvS1NCQ1JWUlhSVVZPSUc1dmR5Z3BLeUJw
Ym

FIG. 23

| TICKET ID | ISSUER | type | ENCRYPTION KEY | HASH VALUE | TERM OF VALIDITY |
|---|---|---|---|---|---|
| e909407a-6e67-48a8-bafa-dcbe72e2f75a | user0001 | promise | F18B8CE2C280B 9F047A69514F2 DE...1631D8DBC 5BB4C | CC72A8B2087E6 B0227460189385 359...0E0666FA4 EE75F5 | 2019-03-03 19:00:00 |
| ... | ... | ... | ... | ... | ... |

FIG. 24

| TICKET ID | OBJECT ID | CALLBACK URL | SESSION KEY |
|---|---|---|---|
| e909407a-6e67-48a8-bafa-dcbe72e2f75a | cae31f90-875e-4b24-ba79-191efb54fa4b | http://shop1.example.com/callback550e8400d42397e88a76b32c | 96A71946993459C163488...E6F8E1A3B98494946DA76E866B86A4C444 |
| ... | ... | ... | ... |

FIG. 25

```
{
  "ticketid":"e909407a-6e67-48a8-bafa-dcbe72e2f75a",
  "objectid":"cae31f90-875e-4b24-ba79-191efb54fa4b"
}
```

FIG. 28

```
{
  "header":{"url":"http://rentacar.example.com/processTicket",
    "ticketid":" 3b0ca73b-1e40-43e4-82d3-54bb3869853a",
    "start":" 2019-03-01 09:00:00",
    "end":" 2019-03-03 19:00:00",
    "description": "cartoken"}},
 "payload":
"YzNjZTFjOTVmNDIlOWZlNDdiN2MyYjFhZGZlMGRjN2Q4NmI4OWZhNDUzGI0Nj
c4ZDY1YjkzOTMxZTcwNGNmZjBZV0poYzJVNkIPS0FtR05oY2w5eIpYSjJhV05sNG9
DWkNuMHBPd3BqYjl1dVpXTjBhVzl1TG1OdmJtNWxZM1FvS1RzS1kyOXVibVZqZE
dsdmJpNXhkV1Z5ZVNqaWdKeFRSVXhGUTFRZ0tpQkdVazlOSUdSeWFYWmxYMIlJ
oZEdFZ1YwaEZVa1VnWTJGeFXUWdQU0RpZ0poaIlYSXdNREF4NG9DWkIFRk9S
Q0J1YjNJb0tTQkNVSVJYUlVWWT0IHNXZkeWdwS3lCcGJuUmxbIpoYkNEaWdKZzFJRz
FwYm5WMFpyUGInSms3NG9DZExDQm0=",
  "signature":" c3ce1c95f49e9fe47...b4678d65b93931e704cff"
}
```

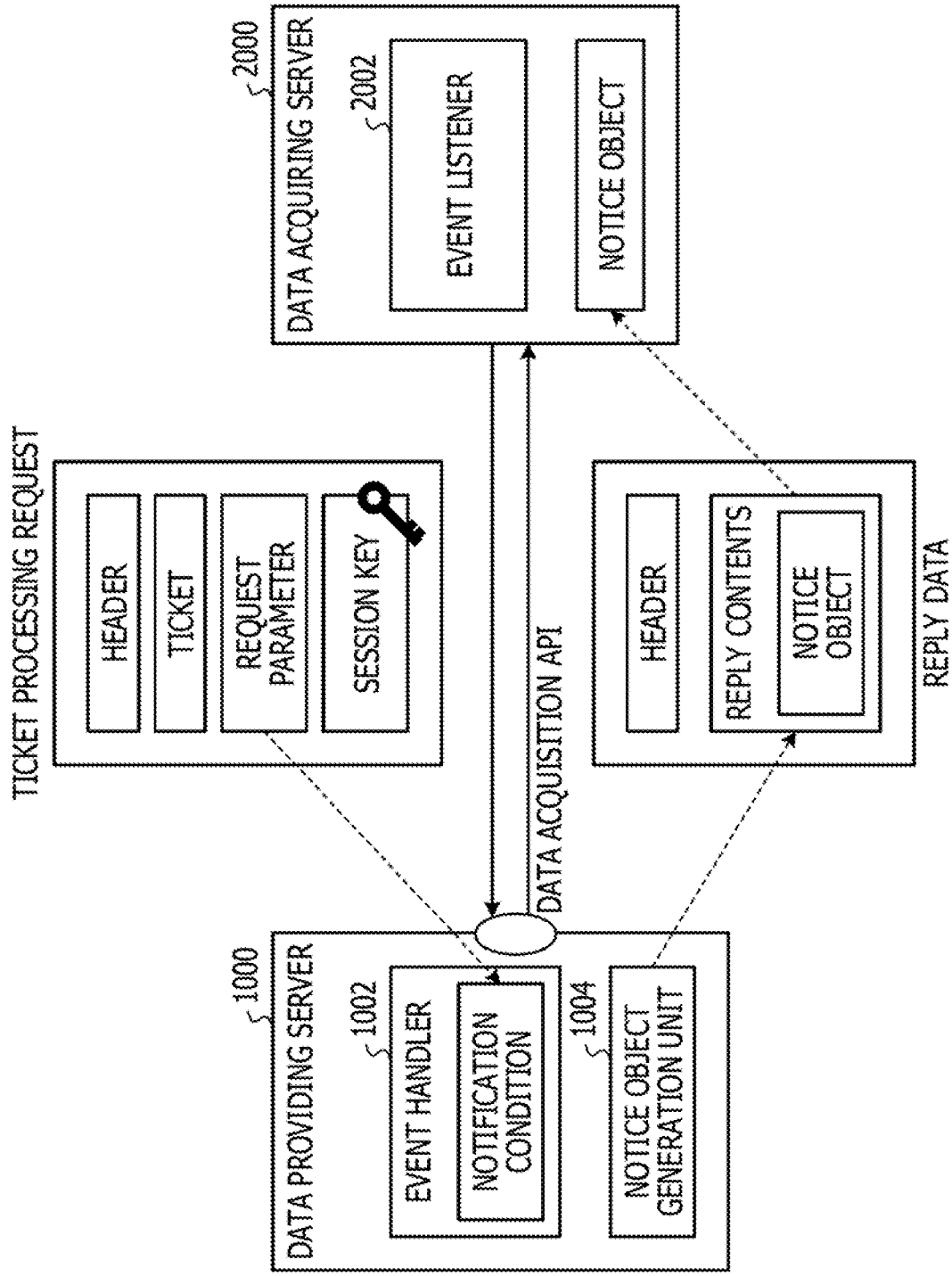

TRANSMISSION OF DATA USABLE BY OTHERS BASED ON AN APPROPRIATE TIMING AND A TRANSMISSION CONDITION

CROSS-REFERENCE TO RELATED APPLICATION

This application is based upon and claims the benefit of priority of the prior Japanese Patent Application No. 2019-91155, filed on May 14, 2019, the entire contents of which are incorporated herein by reference.

FIELD

The embodiments discussed herein are related to transmission of data usable by others based on an appropriate timing and a transmission condition.

BACKGROUND

In a computer system, services are provided using various resources. The resources used for providing the services include software resources such as data or a program and various devices controlled in a computer.

Development of technologies related to Internet of Things (IoT), for example, currently enables various things (IoT devices), including but not limited to the computer, to be coupled to an internet. The IoT devices themselves and data acquired from the IoT are also the resources utilized for providing the services.

The IoT devices may be utilized for data collection. For example, a service provider collects from multiple IoT devices data related to a user who possesses each of the IoT devices, through a cloud computing system. The service provider may obtain a great deal of knowledge by performing data mining of the collected data.

The data collected from the IoT device includes data that represents a characteristic of an action of the user who possesses that IoT device. Consequently, it is possible that not only a collecting service provider utilizes data collected from an IoT device used by a certain user, but also the user himself or herself who provides the data may wish to utilize the data. For example, there is a case where a user may receive an appropriate service (discount in a charge for use of the service, for example), by providing a specific service provider (server of a car rental company) with data via an IoT device, and then providing another service provider (server of a shop, for example) with the data on the user's will. In this case, for example, the service provider that possesses the data passes an access authority to the corresponding data to the another service provider, and the another service provider accesses the data based on the access authority.

Technologies related to the access authority to arbitrary data include OAuth, for example. An authority transfer system is considered that controls so that an approved token may be shared in a range approved by clients. An access right management device is also considered that enables operations such as invalidation, transfer, division, change, or the like of access qualification. It is also considered a resource management system for solving a problem related to a right to use, such as inability to dynamically provide users with the right to use on a network.

Related techniques are disclosed in, for example, Japanese Laid-open Patent Publication Nos. 2003-6160, 11-328254, and 2003-242124.

SUMMARY

According to an aspect of the embodiments, an apparatus receives data access parameters from an external device of a transmission destination, where the data access parameters includes an access ticket, a transmission condition to transmit data, and information on the transmission destination of the data, and the access ticket includes a first program accessible to the data whose utilization by others is authorized by a user. The apparatus generates a notice object corresponding to the information on the transmission destination, and transmits the notice object to the transmission destination. The apparatus executes the first program of the access ticket to acquire the data when the transmission condition is satisfied, and transmits the acquired data to the transmission destination to set the acquired data in the notice object.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a diagram illustrating a specific example of a ticket issuing screen for recommended information;

FIG. 12A is a diagram illustrating an example of a ticket issuing request; and FIG. 12B is a diagram illustrating an example of an access ticket;

FIG. 13 is a diagram illustrating a data acquisition program;

FIG. 15 is a diagram illustrating a specific example of a ticket registration screen;

FIG. 16 is a flowchart illustrating ticket registration processing by the ticket broker server;

FIG. 18 is a diagram illustrating an example of a shop information DB that the ticket broker server has;

FIG. 20 is a diagram illustrating an example of a callback function to transmit discount information;

FIG. 21 is a diagram illustrating an example of a ticket processing request;

FIG. 23 is a diagram illustrating an example of a ticket DB that the car rental company server has;

FIG. 24 is a diagram illustrating an example of a notice object DB that the car rental company server has;

FIG. 25 is a diagram illustrating an example of a ticket processing response;

FIG. 28 is a diagram illustrating an example of a navigation display ticket;

FIGS. 30A and 30B are diagrams schematically illustrating an overview of processing by a data providing server and a data acquiring server, the overview being divided to two phases of a first phase and a second phase.

DESCRIPTION OF EMBODIMENTS

Technologies with which a user provides data, which is provided to a specific service provider through an IoT device, to another service provider on the user's will are not adequately established so far. Consequently, it is not possible to easily achieve provision of the data acquired by the specific service provider to the another service provider at the timing when a certain condition is met.

It is desirable to transmit, to an external device, data whose use by others is agreed by a user, at an appropriate timing when the data meets a transmission condition.

Figure 1:
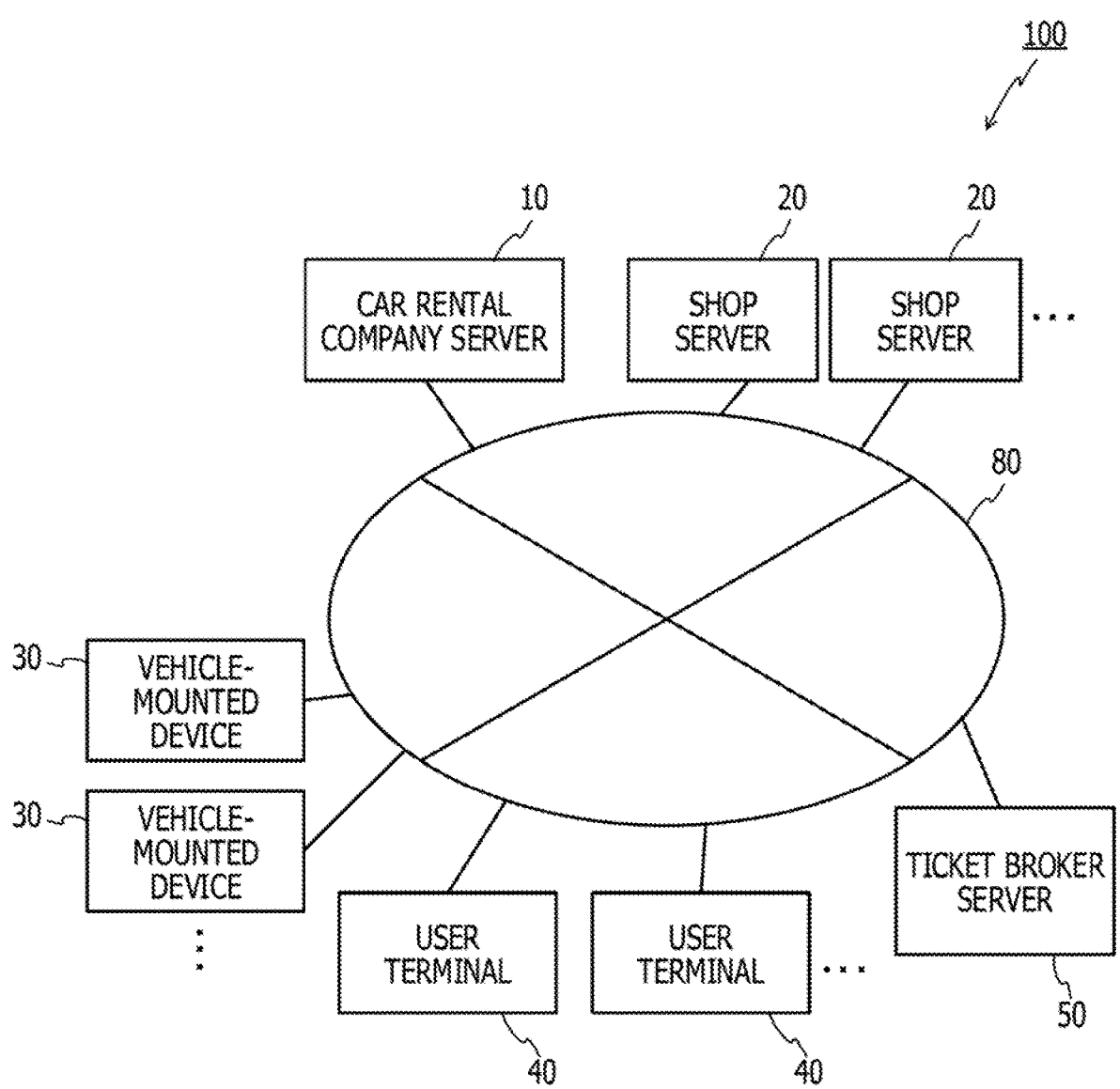
FIG. 1 is a diagram schematically illustrating a configuration of a data access control system according to an embodiment.

Hereinafter, description is given in detail of an embodiment of a data access control system, based on FIGS. 1 to 308. FIG. 1 schematically illustrates a configuration of a data access control system 100 according to the present embodiment.

The data access control system 100 of FIG. 1 is a system that enables a user who utilizes a car rental service to receive useful services from a shop on a driving route by providing in a ticket form with driving information of a rental car that the user himself or herself is driving.

As illustrated in FIG. 1, the data access control system 100 includes a car rental company server 10 as an information processor, a shop server 20 as an external device, a vehicle-mounted device 30 as a device utilized by the user, a user terminal 40, and a ticket broker server 50 as a mediation device. The respective devices included in the data access control system 100 are coupled to a network 80 such as an internet.

The car rental company server 10 collects the driving information (data from the rental car or provides the vehicle-mounted device 30 in the rental car with information based on the collected data. The car rental company server 10 provides in a Web service form information transmitted from the shop server 20 to the rental car.

The shop server 20 transmits to the car rental company server 10 a ticket that is obtained from the user through the ticket broker server 50. The shop server 20 requests the car rental company server 10 to transmit its own shop information to the vehicle-mounted device 30 of the rental car that the user is driving, based on the information received from the car rental company server 10.

The vehicle-mounted device 30 has a navigation system mounted on the rental car and sensors that detect various types of information related to the rental car.

The user terminal 40 is a terminal available to the user, such as a smart phone or a tablet, or the like. In the present embodiment, the user terminal 40 is used in a rental car usage procedure, or the like.

The ticket broker server 50 is a server that collects the ticket acquired by the user terminal 40 from the car rental company server 10 and mediates distribution of the ticket to a shop that wishes to obtain the ticket from the user. In the present embodiment, although the user distributes the ticket to the shop server 20 via the ticket broker server 50, the user himself or herself may directly send the ticket from the user terminal 40 to the shop server 20.

(Regarding the Car Rental Company Server 10)

Figure 2A:
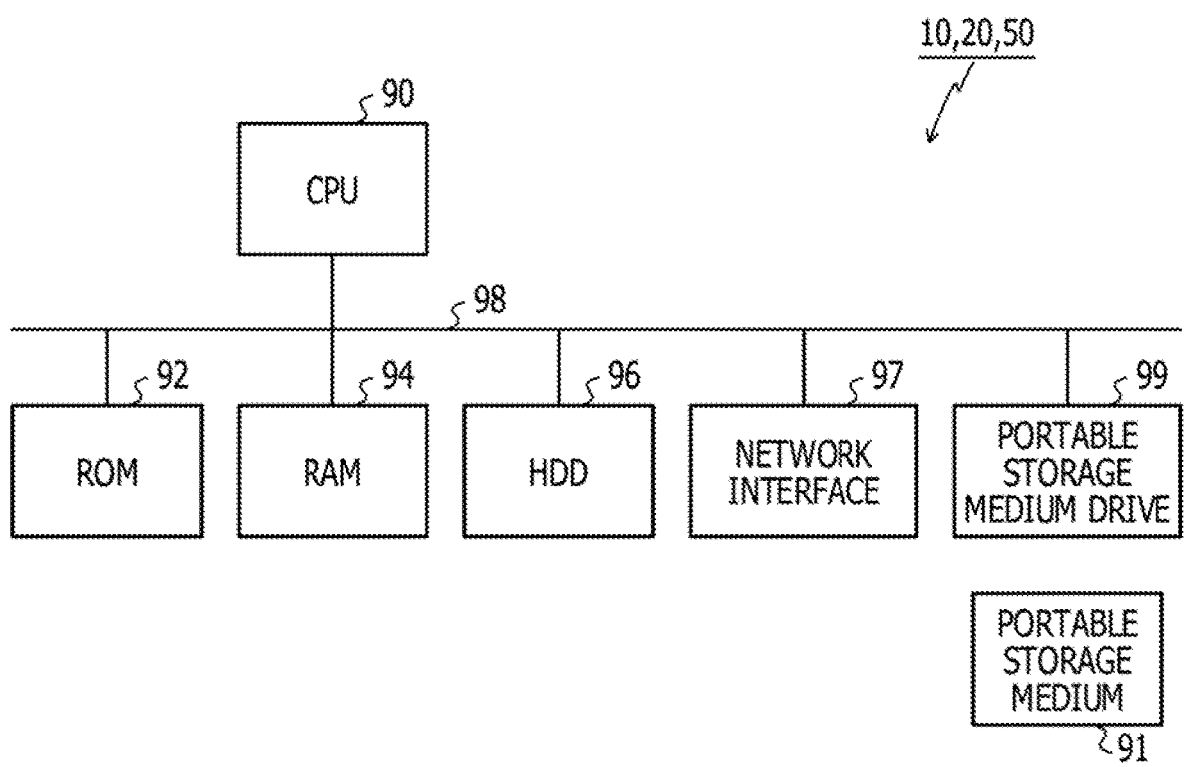
FIG. 2A is a diagram illustrating a hardware configuration of a car rental company server, a shop server, and a ticket broker server.
Figure 4:
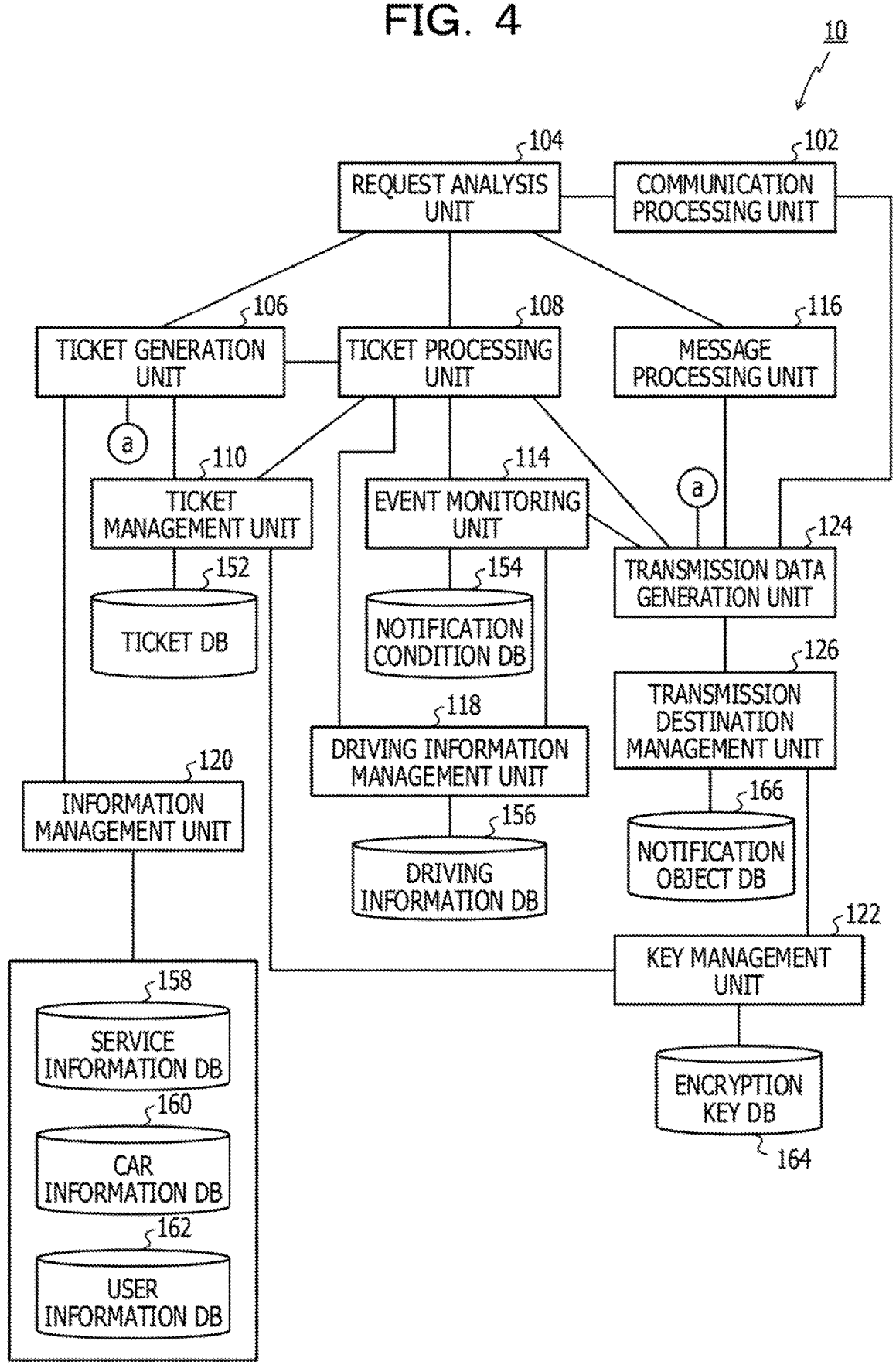
FIG. 4 is a functional block diagram of the car rental company server.

FIG. 2A illustrates a hardware configuration of the car rental company server 10. As illustrated in FIG. 2A, the car rental company server 10 includes a central processing unit (CPU) 90, a read-only memory (ROM) 92, a random-access memory (RAM) 94, a storage unit (hard disk drive (HDD) herein) 96, a network interface 97, and a portable storage medium drive 99. These components of the car rental company server 10 are coupled to a bus 98. In the car rental company server 10, the CPU 90 executes programs (including a data access control program) stored in the ROM 92 or the HDD 96 or programs (including the data access control program) read by the portable storage medium drive 99 from the portable storage medium 91, and functions of the units illustrated in FIG. 4 are thereby realized. FIG. 4 also illustrates various databases (DBs) stored in the HDD 96, or the like. Specific data structures or the like of the various DBs will be described later. The functions of the units illustrated in FIG. 4 may be realized by an integrated circuit, such as an application-specific integrated circuit (ASIC) or a field-programmable gate array (FPGA), for example. Details of the units illustrated in FIG. 4 will be described later.

FIG. 4 illustrates a functional block diagram of the car rental company server 10. As illustrated in FIG. 4, in the car rental company server 10, by executing the programs, the CPU 90 functions as a communication processing unit 102 as a reception unit, a request analysis unit 104, a ticket generation unit 106, a ticket processing unit 108, a ticket management unit 110, an event monitoring unit 114, a message processing unit 116 as a provision unit, a driving information management unit 118, an information management unit 120, a key management unit 122, a transmission data generation unit 124, and a transmission destination management unit 126.

Using the network interface 97, the communication processing unit 102 performs data transmission to and reception from the vehicle-mounted device 30, the user terminal 40, the shop server 20, and the ticket broker server 50, via the network 80.

The request analysis unit 104 analyzes the data received by the communication processing unit 102, and transmits the data to the ticket generation unit 106, the ticket processing unit 108, and the message processing unit 116 according to contents of the data (contents of a request).

The ticket generation unit 106 generates, via the ticket management unit 110, a ticket associated with a ticket issuing request from the user terminal 40, and transmits the generated ticket to the transmission data generation unit 124.

The ticket processing unit 108 analyzes the contents of the ticket received from the shop server 20. If a data type to be returned is normal data, the ticket processing unit 108 requests the driving information management unit 118 to execute a program recorded in the ticket and transmits a result of the execution to the transmission data generation unit 124. If the data type to be returned is of a promise type, the ticket processing unit 108 passes a notification condition to the event monitoring unit 114 and requests the event monitoring unit 114 to generate a notice object. The ticket processing unit 108 transmits the notice object generated as a result to the transmission data generation unit 124. If the data type to be returned is of a ticket type, the ticket processing unit 108 requests the ticket generation unit 106 to generate a new ticket and transmits to the transmission data generation unit 124 the ticket generated as a result.

The ticket management unit 110 performs ticket generation, storage, retrieval, or delete processing, in response to a request. The ticket management unit 110 manages ticket information in a ticket DB 152 (see FIG. 23). Details of the ticket DB 152 will be described later.

The event monitoring unit 114 saves the notification condition received from the ticket processing unit 108, in a notification condition DB 154. The event monitoring unit 114 monitors at all times updated data of the driving information that the driving information management unit 118 manages in a driving information DB 156. If the updated data matches the notification condition, the event monitoring unit 114 transmits the matched data and transmission destination information to the transmission data generation unit 124. The notification condition DB 154 is a database that associates a notification condition string with ticket identification information (ticketid to be described later) and stores the notification condition string. The driving information DB 156 is a database that associates driving information obtained from the sensors in the vehicle-mounted device 30 with the identification information of the vehicle-mounted device 30 and stores the driving information.

When receiving a message transmission request transmitted from the shop server 20, the message processing unit 116 generates a message associated with contents of the request and transmits the message to the vehicle-mounted device 30 of the rental car at a specified destination.

The driving information management unit 118 saves or retrieves in the driving information DB 156 the data (driving information) transmitted real-time from the vehicle-mounted device 30 of the rental car being rented.

In a service information DB 158, the information management unit 120 manages detail information on individual car rental services asked by the user. The service information DB 158 stores various types of information on the car rental service associated with a transaction ID during a rental car usage procedure. In a car information DB 160, the information management unit 120 manages an identification number of the rental car or static information such as cartoken to be described later. The information management unit 120 manages information on a user registered with a car rental company (user ID, name, address, for example) in a user information DB 162.

The key management unit 122 performs management such as generation and storage of an encryption key desired for encryption of a ticket or transmission data. The key management unit 122 performs the management of the encryption key in an encryption key DB 164.

The transmission data generation unit 124 generates transmission data in response to acquired data and transmits the transmission data to a transmission destination specified via the communication processing unit 102.

The transmission destination management unit 126 issues the notice object and performs management such as storage or deletion of the notice object, in a notice object DB 166. The notice object DB 166 is a database as illustrated in FIG. 24 and details of the notice object DB 166 will be described later. The transmission destination management unit 126 acquires, from the key management unit 122, the encryption key corresponding to the transmission destination of the transmission data and transmits the encryption key to the transmission data generation unit 124.

(Regarding the Shop Server 20)

Similarly to the car rental company server 10, the shop server 20 has a hardware configuration as illustrated in FIG. 2A. In the shop server 20, the CPU 90 executes the programs and the functions of the unit illustrated in FIG. 5 are thereby realized.

Figure 5:
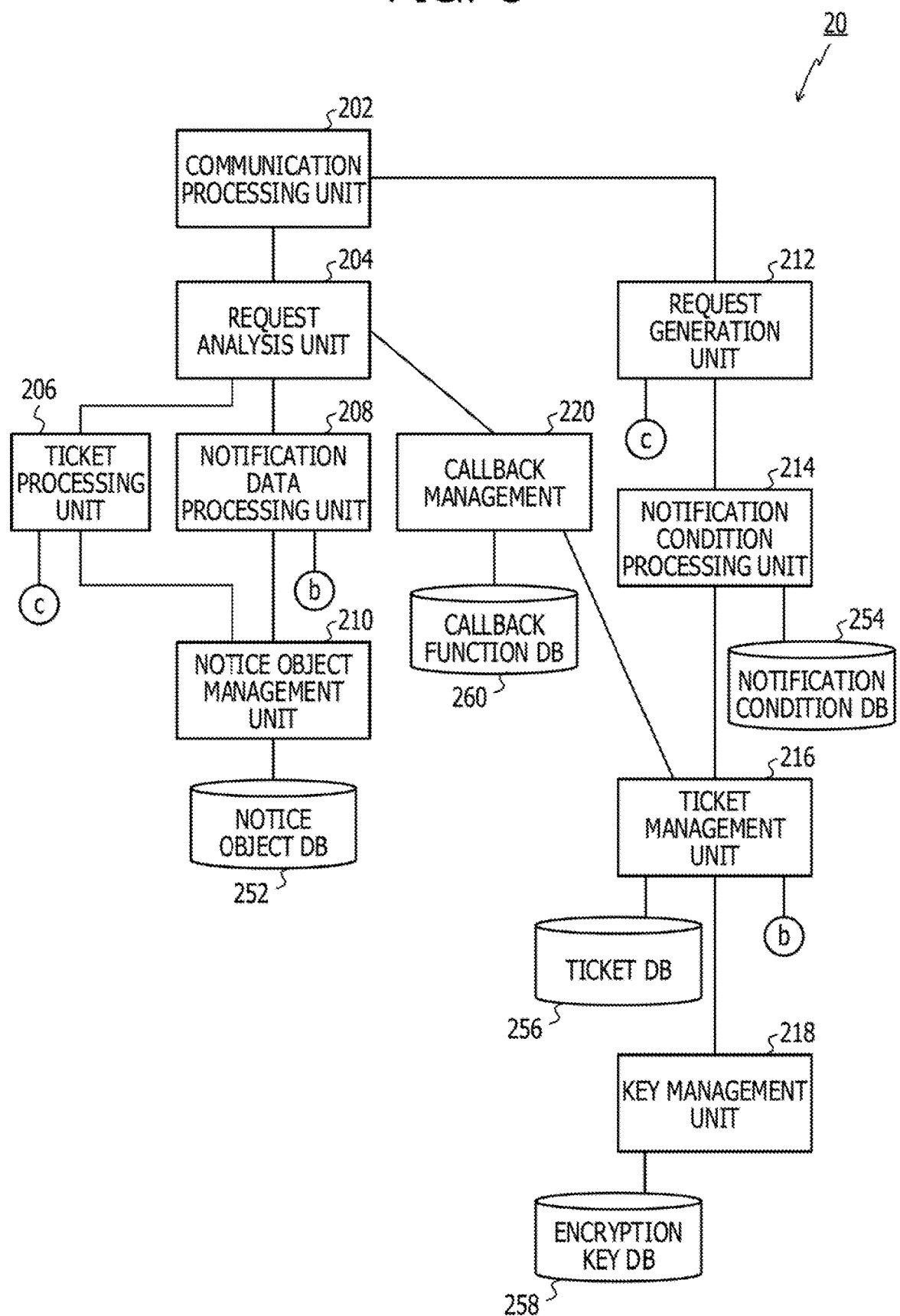
FIG. 5 is a functional block diagram of the shop server.

As illustrated in FIG. 5, the shop server 20 has the functions of a communication processing unit 202, a request analysis unit 204, a ticket processing unit 206, a notice data processing unit 208, a notice object management unit 210, a request generation unit 212, a notification condition management unit 214, a ticket management unit 216, a key management unit 218, and a callback management unit 220.

Using the network interface 97, the communication processing unit 202 performs data transmission to and reception from the car rental company server 10 or the ticket broker server 50, via the network 80.

The request analysis unit 204 analyzes the data received by the communication processing unit 202. If the received data is a ticket, the request analysis unit 204 passes the ticket to the ticket processing unit 206. If the received data is data by way of a callback uniform resource identifier (URI), the request analysis unit 204 passes processing to the notice data processing unit 208.

The ticket processing unit 206 acquires contents included in the received ticket. If the contents are normal data, the ticket processing unit 206 performs service processing associated with the data. If the contents included in the ticket is the notice object, the ticket processing unit 206 passes the notice object to the notice object management unit 210 and enables callback monitoring. If the contents included in the ticket is a new ticket, the ticket processing unit 206 passes the ticket to the request generation unit 212 to transmit to the car rental company server 10.

The notice data processing unit 208 acquires data from the notice object corresponding to a callback URI and performs the service processing associated with the data.

The notice object management unit 210 associates the notice object included in the ticket with the callback URI and stores the notice object in a notice object DB 252. The notice object DB 252 is a database similar to the notice object DB 166.

The request generation unit 212 generates a ticket acquisition request to the ticket broker server 50 or generates a ticket transmission request to the car rental company server 10 by adding to the acquired ticket the notification condition generated by the notification condition management unit 214.

The notification condition management unit 214 generates the notification condition of the ticket to be transmitted to the car rental company server 10 and manages the notification condition in a notification condition DB 254. The notification condition DB 254 is a database that associates the notification condition string with a ticket ID and stores the notification condition string. The notification condition management unit 214 requests the callback management unit 220 to generate a callback function to transmit a message if the driving information matches the notification condition.

The ticket management unit 216 saves in a ticket DB 256 and manages the ticket acquired from the ticket broker server 50 or the user terminal 40. The ticket DB 256 is similar to the ticket DB 152 (FIG. 23).

The key management unit 218 generates an encryption key of a communication path that performs data transmission from the car rental company server 10 to the callback URI, and saves and manages the encryption key in an encryption key DB 258.

The callback management unit 220 generates a callback function in response to a request from the notification condition management unit 214, and saves and manages the request in a callback function DB 260. The callback function DB 260 is a database that associates the callback function with the callback URI and manages the callback function.

(Regarding the Vehicle-Mounted Device 30)

Figure 2B:
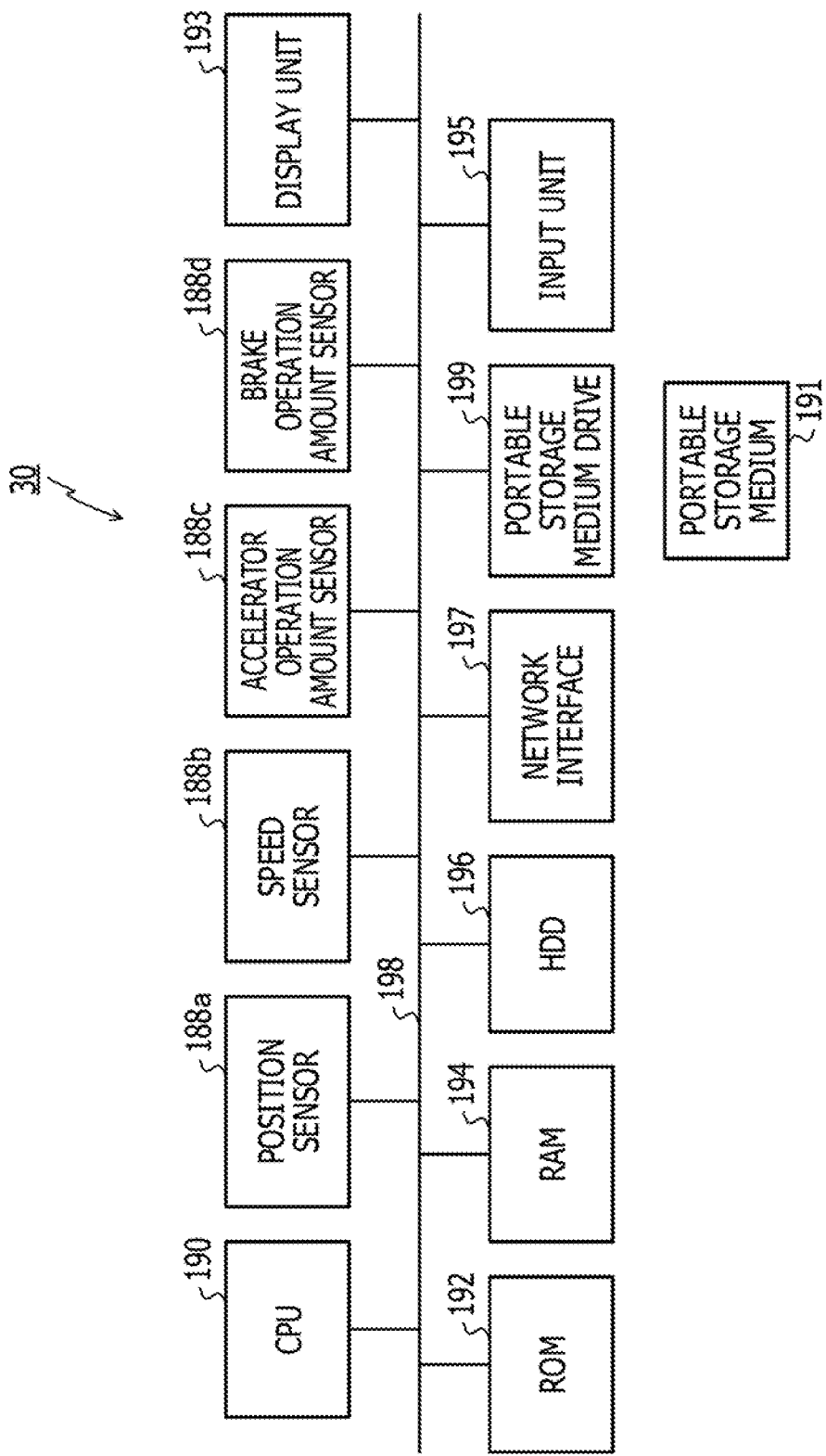
FIG. 2B illustrates a hardware configuration of a vehicle-mounted device.

FIG. 2B illustrates a hardware configuration of the vehicle-mounted device 30. As illustrated in FIG. 2B, the vehicle-mounted device 30 includes, for example, a CPU 190, a ROM 192, a RAM 194, a storage unit (HDD) 196, a network interface 197, a portable storage medium drive 199, a display unit 193, an input unit 195, a position sensor 188a, a speed sensor 188b, an accelerator operation amount sensor 188c, a brake operation amount sensor 188d. These components of the vehicle-mounted device 30 are coupled to a bus 198. In the vehicle-mounted device 30, the CPU 190 executes a program stored in the ROM 192 or the HDD 196 or a program read by the portable storage medium drive 199 from the portable storage medium 191, and the functions of the units illustrated in FIG. 6A are thereby realized.

Figure 6A:
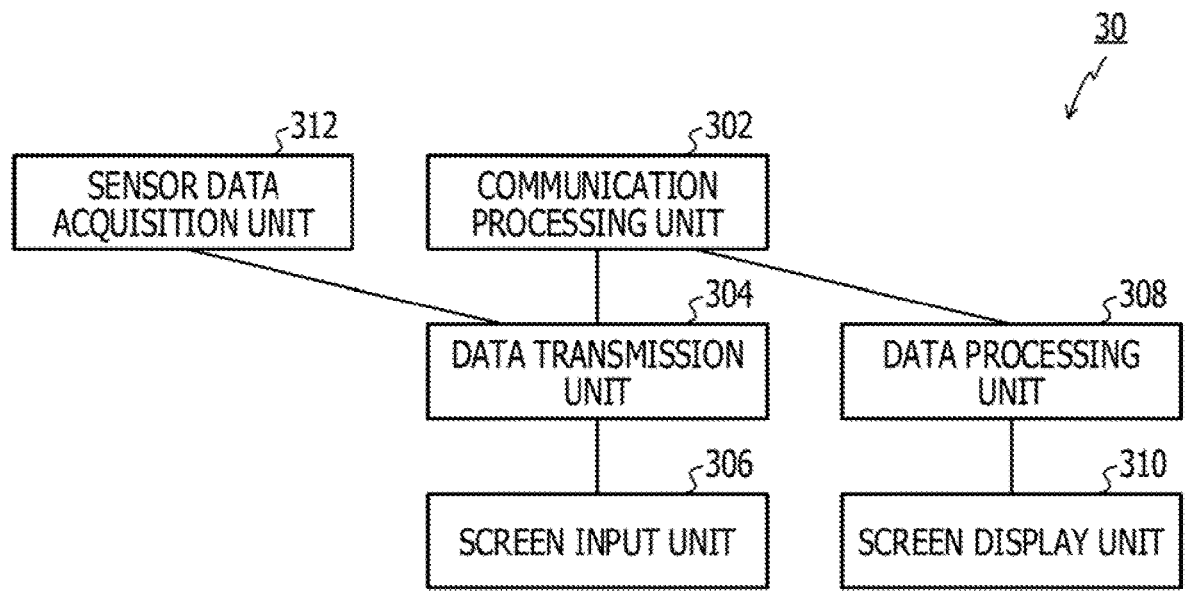
FIG. 6A is a functional block diagram of the vehicle-mounted device.
Figure 6B:
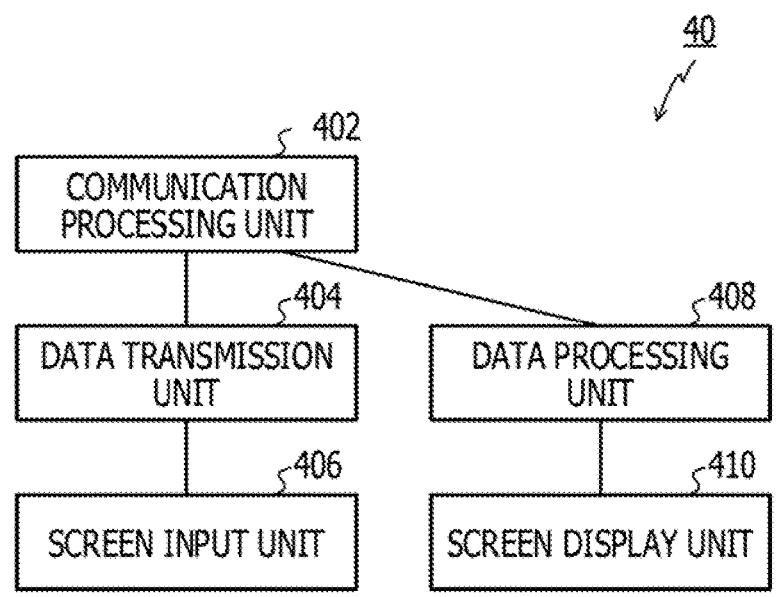
FIG. 6B is a functional block diagram of the user terminal.

The CPU 190 executes the program, and the vehicle-mounted device 30 thereby functions as a communication processing unit 302, a data transmission unit 304, a screen input unit 306, a data processing unit 308, a screen display unit 310, and a sensor data acquisition unit 312 as illustrated in FIG. 6A.

Using the network interface 197, the communication processing unit 302 performs the data transmission to and reception from the car rental company server 10 via the network 80.

The data transmission unit 304 transmits, to the car rental company server 10 via the communication processing unit 302, a value acquired by the sensor data acquisition unit 312 from the sensors 188a to 188d that the vehicle-mounted device 30 has or a request from the user input of which is accepted by the screen input unit 306.

The screen input unit 306 is a data input means such as a touch panel or a keyboard and passes the input data to the data transmission unit 304.

The data processing unit 308 analyzes the data received by the communication processing unit 302 and passes the data to the screen display unit 310.

The screen display unit 310 converts the data passed from the data processing unit 308 into a format displayable on the display unit 193 and displays the data in a form visible to the user, on the display unit 193.

(Regarding the User Terminal 40)

Figure 3:
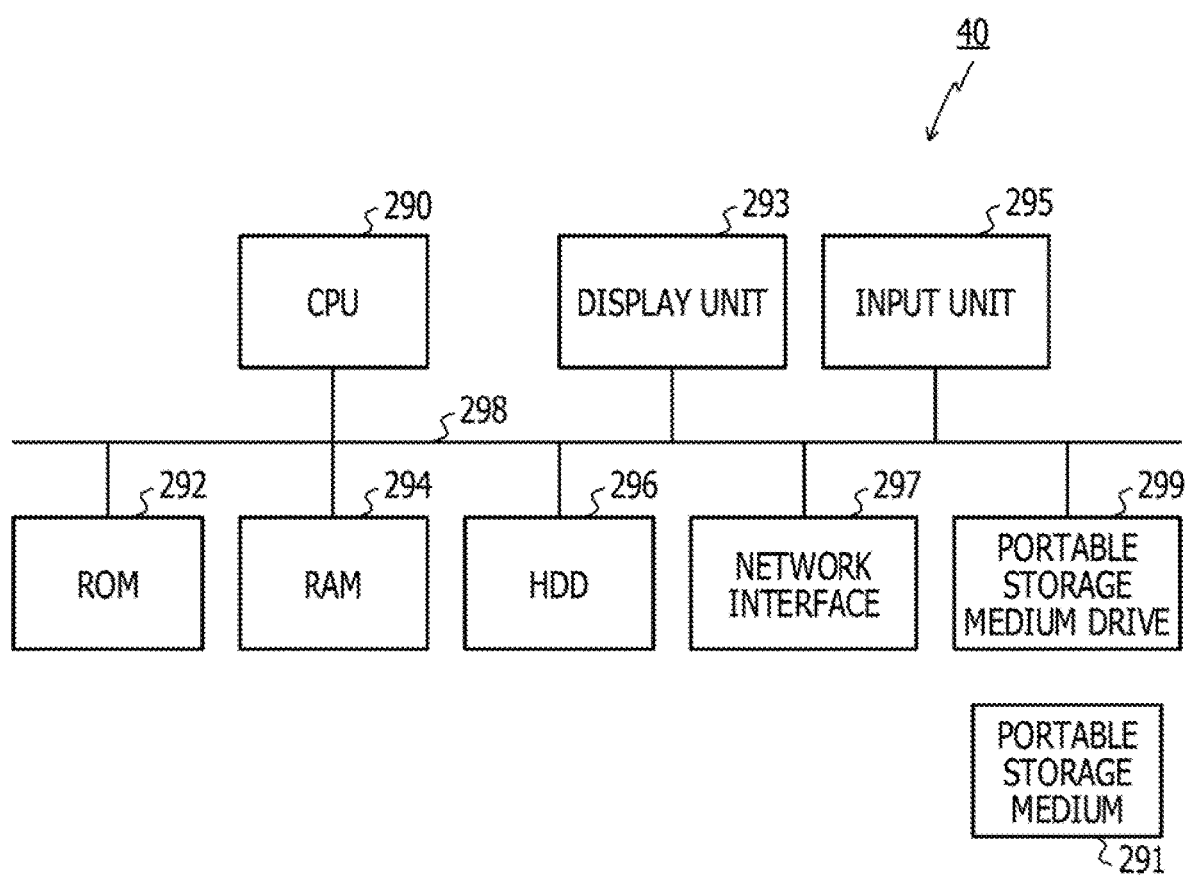
FIG. 3 is a diagram illustrating a hardware configuration of a user terminal.

The user terminal 40 has a hardware configuration as illustrated in FIG. 3. For example, as illustrated in FIG. 3, the user terminal 40 includes a CPU 290, a ROM 292, a RAM 294, a storage unit (HDD) 296, a network interface 297, a portable storage medium drive 299, a display unit 293, and an input unit 295. These components of the user terminal 40 are coupled to a bus 298. In the user terminal 40, the CPU 290 executes a program stored in the ROM 292 or the HDD 296 or a program read by the portable storage medium drive 299 from the portable storage medium 291, and the functions of the units illustrated in FIG. 68 are thereby realized.

As illustrated in FIG. 68, the CPU 290 executes the program, and the user terminal 40 thereby has functions as a communication processing unit 402, a data transmission unit 404, a screen input unit 406, a data processing unit 408, and a screen display unit 410.

The communication processing unit 402, the data transmission unit 404, the screen input unit 406, the data processing unit 408, and the screen display unit 410 have similar functions to the corresponding units 302, 304, 306, 308, and 310 of the foregoing user terminal 40.

(Regarding the Ticket Broker Server 50)

The ticket broker server 50 has a hardware configuration (see FIG. 2A) similar to the foregoing car rental company server 10 or the shop server 20.

Figure 7:
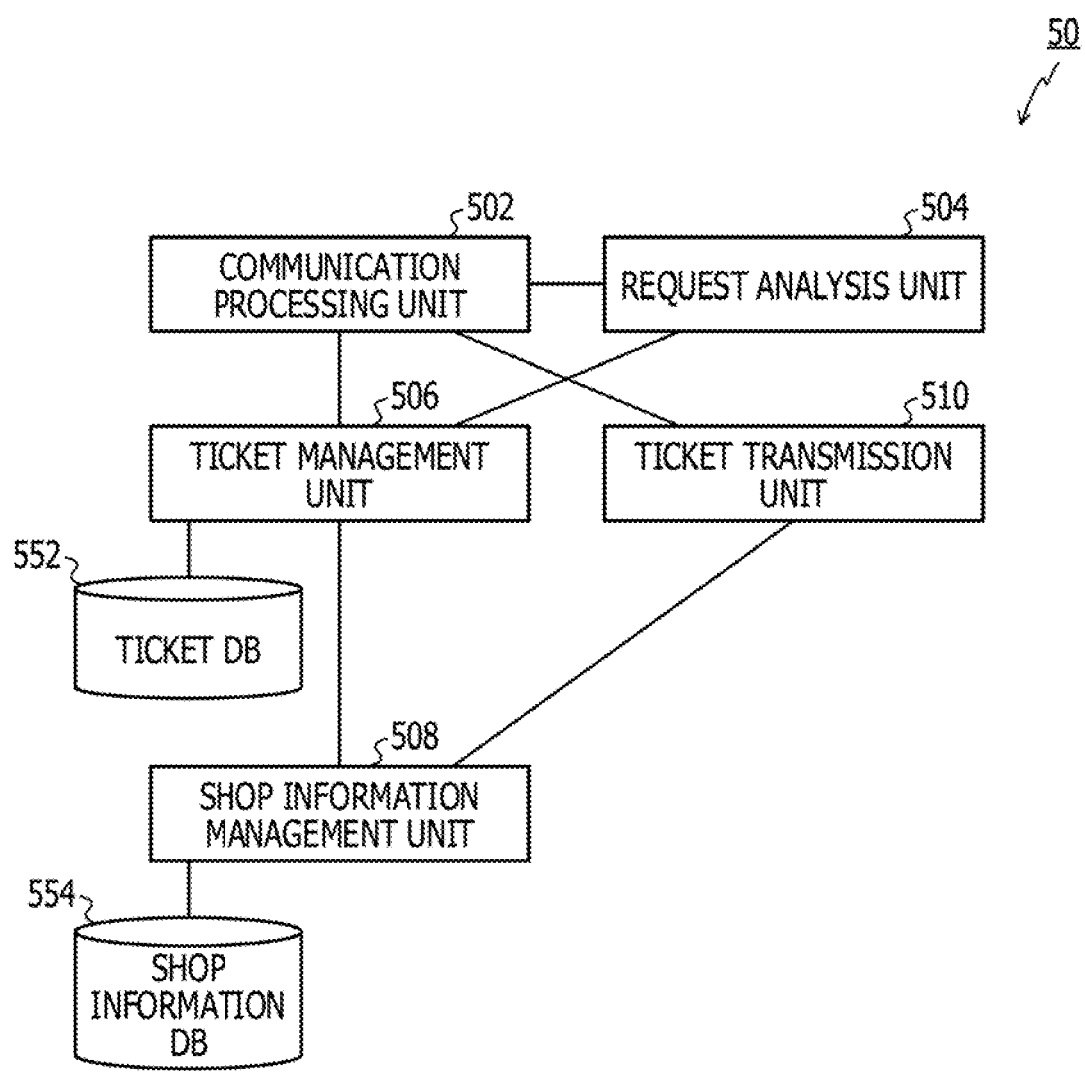
FIG. 7 is a functional block diagram of the ticket broker server.

The CPU 90 executes the program, and the ticket broker server 50 thereby functions as a communication processing unit 502, a request analysis unit 504, a ticket management unit 506, a shop information management unit 508, and a ticket transmission unit 510, which are illustrated in FIG. 7.

Using the network interface 97, the communication processing unit 502 performs the data transmission to and reception from another server or device via the network 80.

The request analysis unit 504 analyzes the data received by the communication processing unit 502. If the received data is a ticket storage request, the request analysis unit 504 passes the ticket to the ticket management unit 506. If the received data is the ticket acquisition request, the request analysis unit 504 transmits to the ticket management unit 506 a command to retrieve a ticket that matches contents of the request. The ticket management unit 506 passes the retrieved ticket to the ticket transmission unit 510.

The ticket management unit 506 stores and manages the received ticket in a ticket DB 552 and retrieves in the ticket DB 552 a ticket that the shop information management unit 508 transmits to a shop retrieved from a shop information DB 554. The ticket DB 552 is similar to the ticket DB 152 (FIG. 23).

The shop information management unit 508 manages a list of shops that may acquire tickets and the shop information in the shop information DB 554. The shop information DB 554 is similar to a database as illustrated in FIG. 18, and details of the shop information DB 554 will be described later.

The ticket transmission unit 510 transmits the ticket to the shop server 20 that matches a ticket distribution condition, via the communication processing unit 502.

(Overview of Processing to be Performed in the Data Access Control System 100)

FIGS. 8A to 9B illustrate an overview of processing in the present embodiment. Hereinafter, description is given of the overview of the processing with reference to FIGS. 8A to 9B.

Figure 8A:
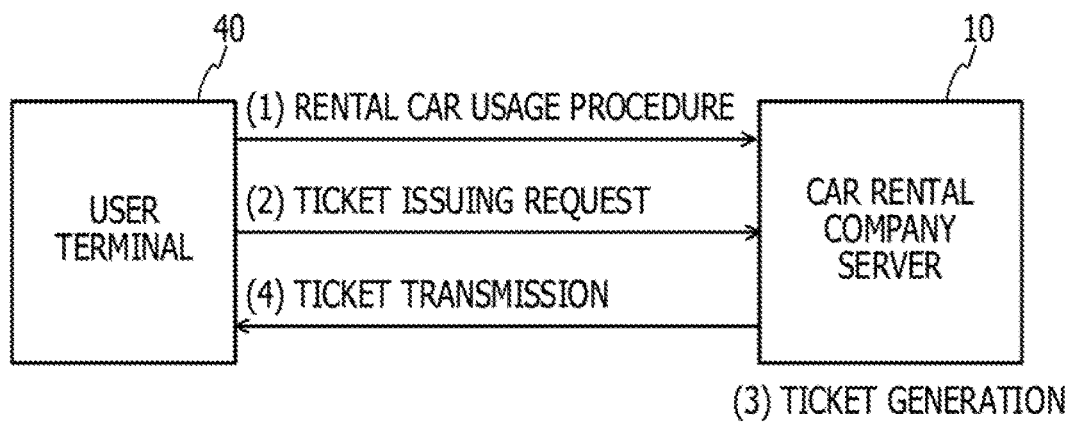
FIGS. 8A and 8B are diagrams (No. 1) illustrating an overview of processing of an embodiment.

(Processing of FIG. 8A)

FIG. 8A illustrates exchange between the user terminal 40 and the car rental company server 10 in a case where the user performs the rental car usage procedure.

The user displays a rental car usage procedure screen on the user terminal 40 and performs input. With this, as illustrated in FIG. 8A, (1) the user terminal 40 performs the rental car usage procedure by transmitting to the car rental company server 10 information input on the rental car usage procedure screen. When the user displays a ticket issuing screen on the user terminal 40 and performs input, (2) the user terminal 40 makes the ticket issuing request to the car rental company server 10.

In response, (3) the car rental company server 10 generates the ticket responding to the ticket issuing request, and (4) returns the generated ticket to the user terminal 40.

Figure 8B:
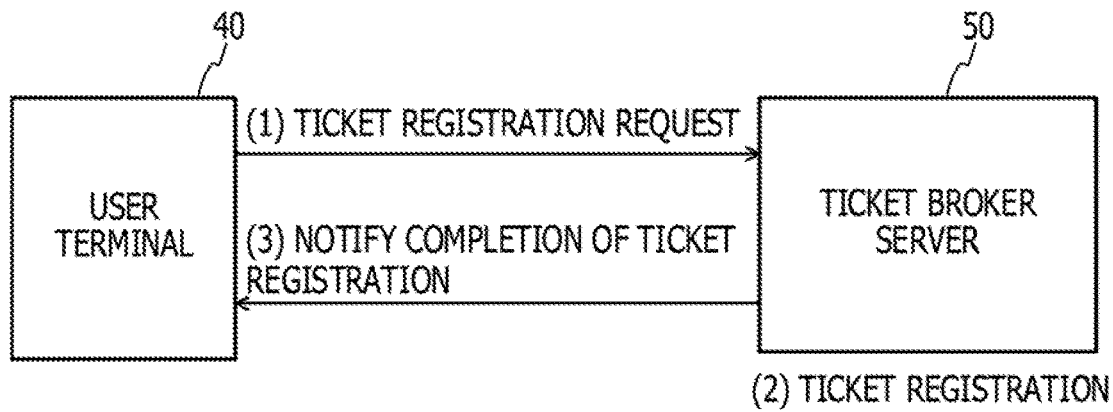

(Processing of FIG. 8B)

FIG. 8B illustrates exchange between the user terminal 40 that receives the ticket and the ticket broker server 50.

In the exchange of FIG. 88, (1) the user terminal 40 transmits to the ticket broker server 50 a request to register the received ticket. In response, (2) the ticket broker server 50 performs ticket registration. (3) The ticket broker server 50 notifies the user terminal 40 of completion of the ticket registration.

Figure 9A:
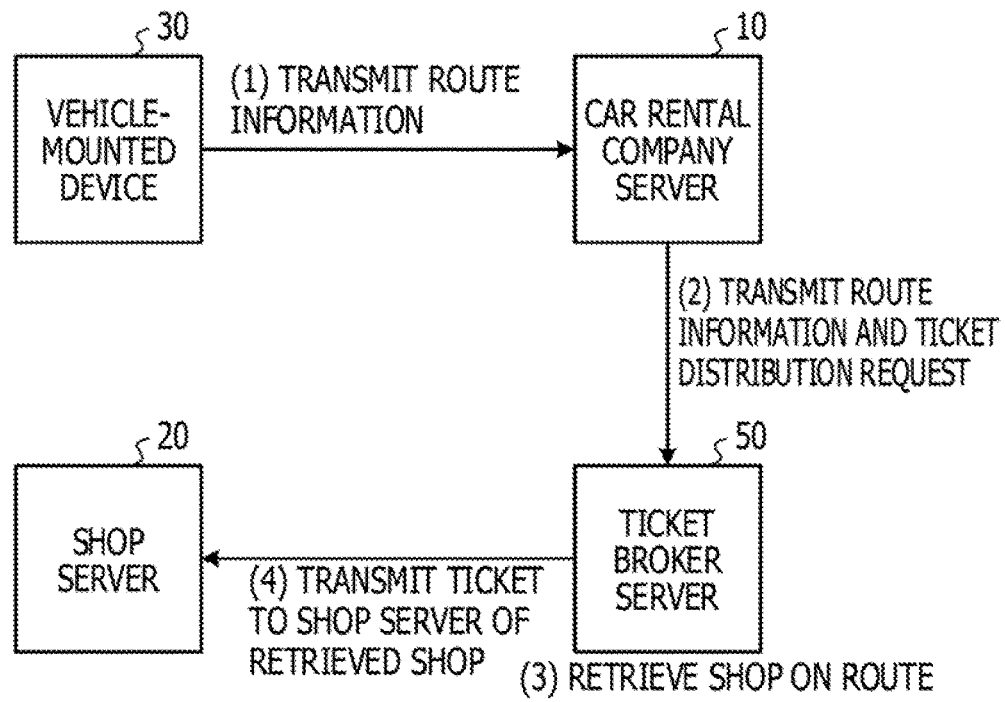
FIGS. 9A and 9B are diagrams (No. 2) illustrating the overview of the processing of the embodiment.

(Processing of FIG. 9A)

FIG. 9A illustrates processing to be performed after the user who utilizes the rental car performs route retrieval in the vehicle-mounted device 30.

In the processing of FIG. 9A, when the user performs the route retrieval using navigation of the vehicle-mounted device 30 and the route is determined, (1) the vehicle-mounted device 30 transmits route information to the car rental company server 10. Then, (2) the car rental company server 10 transmits the route information and a ticket distribution request to the ticket broker server 50. Then, (3) the ticket broker server 50 retrieves a shop on the route (in the vicinity of the route). Then, (4) the ticket broker server 50 transmits to the shop server 20 of the retrieved shop a ticket of the user who plans to drive on the received route.

Figure 9B:
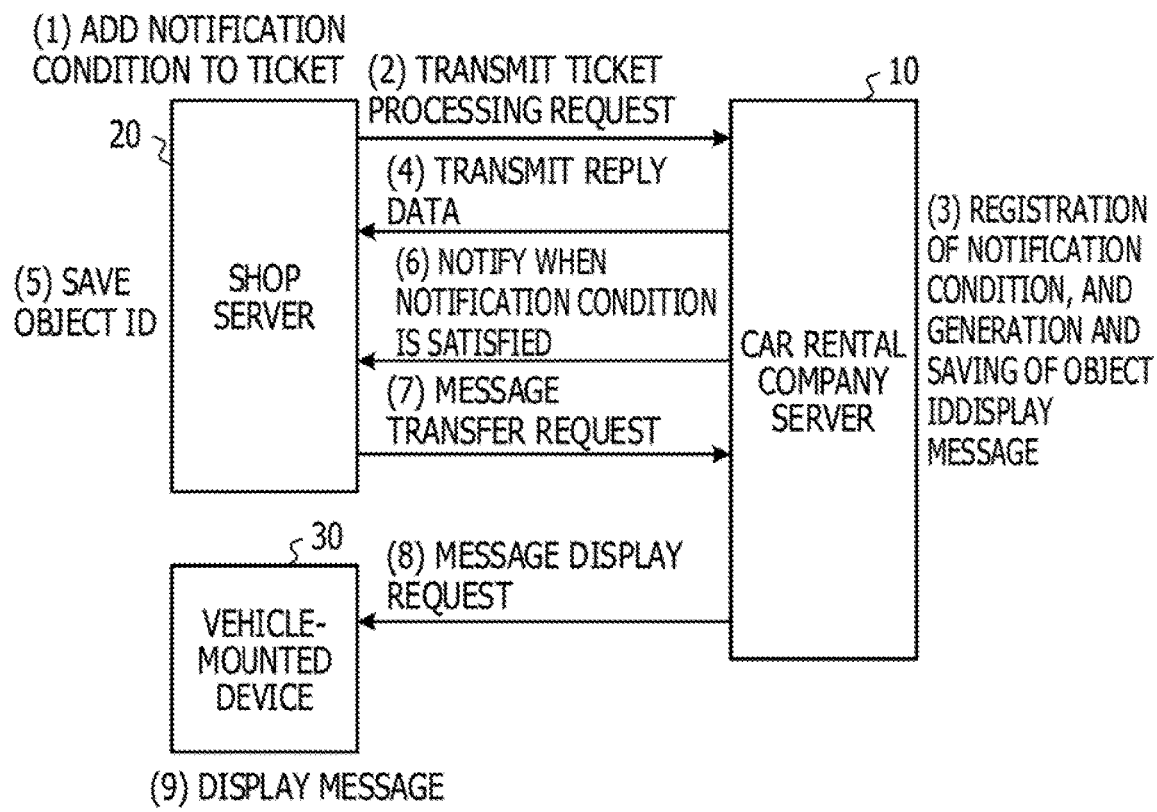

(Processing of FIG. 9B)

FIG. 9B illustrates processing after the shop server 20 receives the ticket.

In the processing of FIG. 98, when the shop server 20 receives the ticket, (1) the shop server 20 adds the notification condition to the ticket. (2) The shop server 20 transmits to the car rental company server 10 a request to process the ticket to which the notification condition is added. (3) When receiving the request to process the ticket, the car rental company server 10 registers the notification condition, or generates and saves an object ID. (4) The car rental company server 10 transmits reply data including the generated object ID to the shop server 20. (5) The shop server 20, which receives the reply data, saves the object ID and after that enters a callback call standby state.

Subsequently, (6) the car rental company server 10 waits till the received notification condition is satisfied. The car rental company server 10 notifies the shop server 20 when the notification condition is satisfied.

(7) When receiving a notice, the shop server 20, which is notified, makes a transfer request of a message (for example, shop discount information or the like) to the car rental company server 10. In response to this, (8) the car rental company server 10 outputs a display request to the vehicle-mounted device 30 to display the message for which the transfer request is accepted. (9) In response to the display request, the vehicle-mounted device 30 displays the message on a navigation screen.

With the above processing, the user who hires the rental car may display a useful message (such as discount information) on the vehicle-mounted device 30 (navigation screen) at an appropriate timing, by providing the car rental company with his or her own driving information.

(Regarding Details of the Processing)

Hereinafter, description is given of details of the processing to be performed in the data access control system 100, based on FIGS. 10 to 29.

As an assumption of the processing, the respective servers shall have the following Web service interfaces.

<Car Rental Company Server 10>

(a) Rental car usage procedure screen: http://rentacar.example.com/rentacar (b) Ticket issuing accept: http://rentacar.example.com/aeateTicket (c) Ticket processing accept: http://rentacar.example.com/processTicket (d) Message transfer accept: http://rentacar.example.com/transferMessage (e) Driving data reception accept: http://rentacar.example.com/uploadDriveData <Shop Server 20>

(a) Ticket acquisition accept: http://shop1.example.com/getTicket (b) Data reception callback: http://shop1.example.com/callback550e8400d42397e88a76b32c (A String after "Callback" Shall be a Value that Varies Depending on Each Ticket.)

<Vehicle-Mounted Device 30>

(a) Message display accept: http://car0001.example.com/displayMessage

<Ticket Broker Server 50>

(a) Ticket registration accept: http://ticketbroker.example.com/registerTicket (b) Ticket distribution accept: http://ticketbroker.example.com/deliverTicket (Ticket Generation Processing (Processing of FIG. 8A))

The rental car user accesses the rental car usage procedure screen (http://rentacar.example.com/rentacar) with a Web browser of the user terminal 40 that the rental car user himself or herself uses, and performs the rental car usage procedure.

Figure 10:
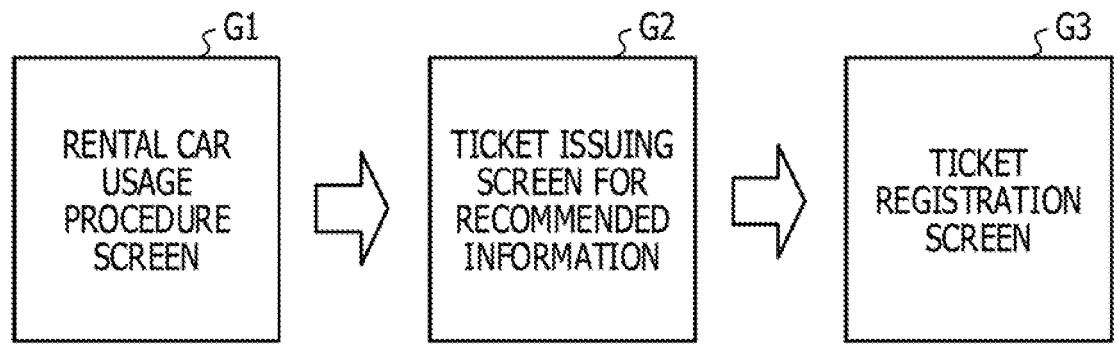
FIG. 10 is a diagram illustrating an example of a series of screen transitions in a rental car usage procedure.

FIG. 10 illustrates an example of a series of screen transitions in the rental car usage procedure. The user accesses the car rental company server 10 using the user's own ID and performs the rental car usage procedure by entering information requested on the rental car usage procedure screen (G1). When the user completes the rental car usage procedure, the car rental company server 10 displays to the user terminal 40 a screen (ticket issuing screen (G2) for recommended information of FIG. 10) for confirming whether to issue a ticket for receiving recommended information. In the present embodiment, the user who sets the route on the navigation screen may obtain the recommended information (information such as a discount service) from a shop on (near) the route by allowing provision of the driving information (requesting ticket issuing) to the shop.

FIG. 11 illustrates a specific example of the ticket issuing screen G2 for recommended information. On the screen of FIG. 11, the user may select a situation in which the user is notified of the recommended information (notification condition). The user presses "Issue Ticket" button after selecting the notification condition on the screen or presses "Do Not Issue Ticket" button without selecting the notification condition.

When the user presses "Issue Ticket" button, the ticket issuing request is transmitted from the user terminal 40 to a ticket issuing accept an application programming interface (API) (http://rentacar.example.com/createTicket) of the car rental company server 10. FIG. 12A is an example of the ticket issuing request.

In the example of FIG. 12A, data in the ticket issuing request is written in a JavaScrip® object notation (JSON) format. In this, "userid" is an ID of the user who logs in the rental car usage procedure, and "credential" is data for which a transaction ID with which the rental car usage procedure is performed is signed with a user's secret key. "type" represents a data type of contents to be returned by the ticket. The "type" is "plain" in the case of the normal data, "promise" in the case of the data of a notice type, and "ticket" in the case of the data of the ticket type. "data" represents a name of data acquisition of which with this ticket is desired. "duration" and "condition" are properties requested in the case of data of the notice type. "duration" represents a period of the data acquisition. In the case of FIG. 12A, the duration states that the data is transmitted from time of notification to 5 minutes before. "condition" may describe the notification condition that may be specified. In the case of FIG. 12A, the "condition" describes a distance to a destination (to_destination) and level of acceleration or deceleration (acceleration_level).

To this ticket issuing request, the ticket generation unit 106 of the car rental company server 10 gives an instruction to the ticket management unit 110 to generate an access ticket as illustrated in FIG. 12B and returns the access ticket to the user terminal 40 via the transmission data generation unit 124 and the communication processing unit 102. The ticket management unit 110 saves the generated access ticket in the ticket DB 152.

In the access ticket of FIG. 12B, "header" describes "url", "ticketid", "start", "end", "metadata", and "description". In this, "url" describes a Uniform Resource Locator (URL) (http://rentacar.example.com/processTicket) of a ticket processing accept API as an addressee when the issued ticket is utilized. "ticketid" signifies a unique identifier indicative of the ticket. "start" and "end" signify a valid period of the ticket. The valid period of the ticket is from "start" time to "end" time. "metadata" signifies a data acquisition interval. In the example of FIG. 12B, "metadata" states that data is checked at an interval of 5 minutes. "description" describes a name of data to be acquired.

In the access ticket of FIG. 12B, "payload" describes an encrypted data acquisition program. "condition" describes the notification condition that may be specified. In the example of FIG. 12B, "condition" describes the distance to the destination (to_destination) and the level of acceleration or deceleration (acceleration_level). "signature" is data for which an issuer (car rental service) signs on a hash value of the ticket data and is used to detect falsification of the ticket data.

FIG. 13 illustrates an example of the data acquisition program (state prior to the encryption of the data acquisition program described in "payload" in FIG. 12B).

FIG. 13 illustrates an example in which a database of a data acquisition destination includes MySQL and data retrieval is possible in an SQL statement. The example of FIG. 13 describes a program that acquires driving information data (drivedata) of a rental car whose car ID is "car0001" for 5 minutes. The database or a retrieval program language is not limited to MySQL or the SQL statement.

Figure 14:
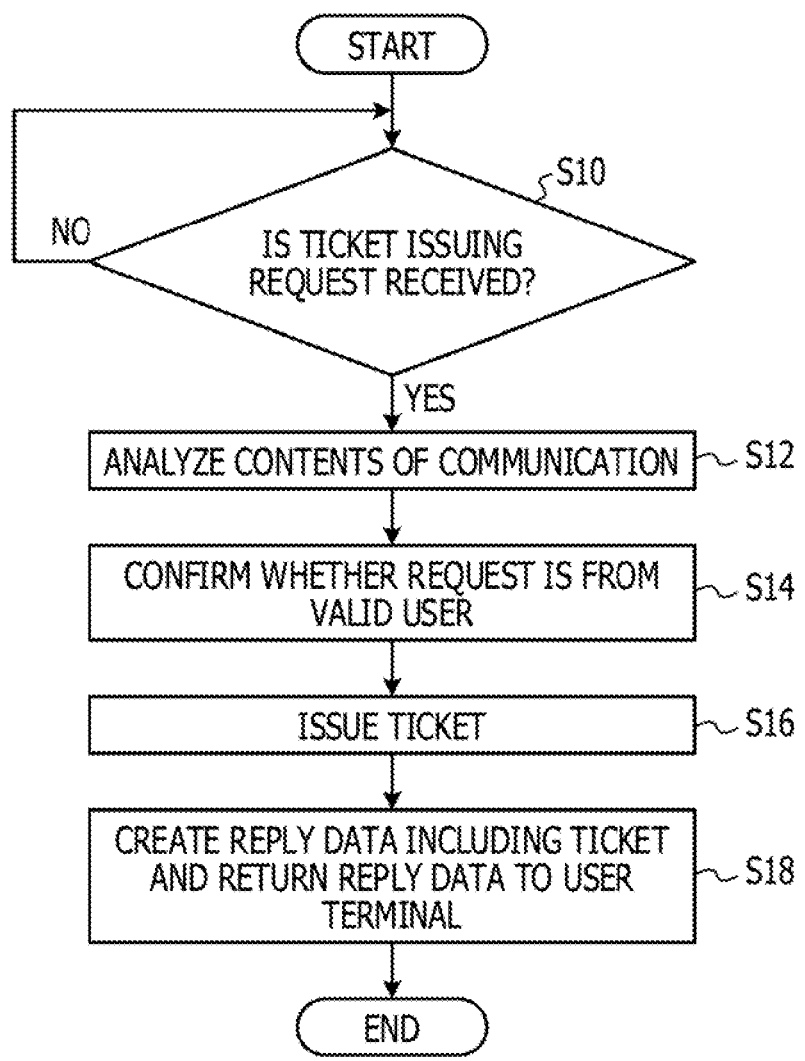
FIG. 14 is a flowchart illustrating ticket generation and return processing by the car rental company server.

With reference to the flowchart of FIG. 14, detailed description is given of specific processing till the car rental company server 10, which receives the ticket issuing request from the user terminal 40, generates and returns the ticket.

When the communication processing unit 102 of the car rental company server 10 receives the ticket issuing request (S10: Yes), the request analysis unit 104 analyzes contents of received communication (S12). When recognizing that the received communication is the ticket issuing request, the request analysis unit 104 passes the processing to the ticket generation unit 106.

The ticket generation unit 106 passes to the information management unit 120 values of "userid" and "credential" included in the ticket issuing request and makes a request to confirm whether or not the ticket issuing request is a request from a valid user. The information management unit 120 decrypts contents of "credential" with a public key of the user, and verifies whether the transaction ID obtained from the contents matches contents saved in the service information DB 158 (S14). As a result of this verification, if the transaction ID matches the contents saved in the service information DB 158, the information management unit 120 considers that the ticket issuing request is the request from the valid user and returns confirmation OK to the ticket generation unit 106.

The ticket generation unit 106 passes to the ticket management unit 110 values of "type", "data", "duration", and "condition" included in the ticket issuing request and requests the ticket management unit 110 to issue a ticket. The ticket management unit 110 generates a data acquisition program, an encryption key, and a ticket ID according to the passed values, generates a ticket including the program encrypted with the encryption key, and returns the ticket to the ticket generation unit 106 (S16). The ticket generation unit 106 passes the generated ticket to the transmission data generation unit 124. The transmission data generation unit 124 creates reply data including the ticket and sends the reply data to the user terminal 40 via the communication processing unit 102 (S18).

(Registration of the Ticket with the Ticket Broker Server 50 (Processing of FIG. 8B))

Hereinafter, description is given of processing of ticket registration with the ticket broker server 50.

When a browser of the user terminal 40 receives the ticket issued by the car rental company server 10 according to the input on the ticket issuing screen of FIG. 11, the user terminal 40 saves the ticket in a storage (such as the HDD 296). The ticket issuing screen transitions to a ticket registration screen as illustrated in FIG. 15 (screen G3 of FIG. 10). The ticket registration screen of FIG. 15 displays the contents described in the received ticket (what driving information is offered to a shop). Thus, if the user agrees on information to be provided, the user presses "Register Ticket" button. When the user presses "Register Ticket" button, the user terminal 40 transmits the ticket registration request including the ticket to the ticket registration accept API (http://ticketbroker.example.com/registerTicket) of the ticket broker server 50.

In the ticket broker server 50, the processing along the flowchart of FIG. 16 is performed. For example, when the communication processing unit 502 receives the ticket registration request (S20: Yes), the request analysis unit 504 extracts the ticket information included in the registration request and saves the ticket in the ticket DB 552 via the ticket management unit 506 (S22). When successfully saving the ticket in the ticket DB 552, the ticket management unit 506 creates reply data on the completion of ticket registration (S24), and sends the reply data to the user terminal 40 via the communication processing unit 502 (S26).

If the user selects "Do not Register Ticket" on the ticket registration screen of FIG. 15, the processing of FIG. 16 ends at that time.

(Ticket Acquisition (Processing of FIG. 9A))

Hereinafter, description is given of processing by which the shop server 20 acquires the ticket issued to the user terminal 40.

When the user hires the rental car and performs route setting to a destination on the vehicle-mounted device 30 (navigation screen) in the rental car, the route information is transmitted from the vehicle-mounted device 30 to the car rental company server 10.

The car rental company server 10, which receives the route information, transmits the ticket distribution request including the route information to the ticket distribution accept API (http://ticketbroker.example.com/deliverTicket) of the ticket broker server 50.

Figure 17:
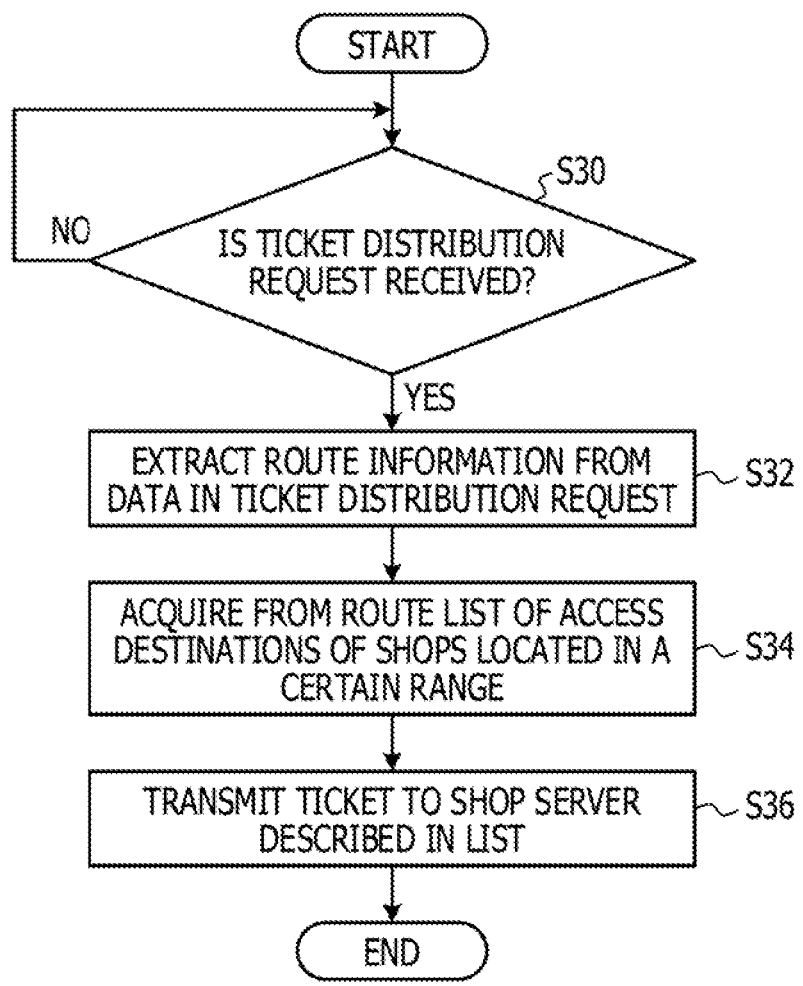
FIG. 17 is a flowchart illustrating processing of the ticket broker server when the shop server acquires a ticket.

FIG. 17 illustrates processing of the ticket broker server 50 of this time in the flowchart. In the ticket broker server 50, when the communication processing unit 502 receives the ticket distribution request (S30: Yes), the request analysis unit 504 extracts the route information from the request data (S32). The request analysis unit 504 requests the shop information management unit 508 to acquire from the extracted route a list of access destinations (ticket accept URLs) of shops located in a certain range.

The shop information management unit 508 retrieves an applicable shop from the shop information DB 554, creates a list of the ticket accept URLs of the retrieved shops, and sends the list to the ticket management unit 506 (S34). The ticket management unit 506 transmits the ticket of the user who performs the route setting to all of the ticket accept URLs listed in the acquired list (S36).

Information on shops that are candidates of ticket distribution destinations is saved in advance in the shop information DB 554, and the shop information is in a retrievable state via the shop information management unit 508. FIG. 18 illustrates an example of the shop information DB 554. This shop information DB 554 stores information on a "shop name", "position information", the "ticket accept URL", and a "shop type" that are associated with a "shop ID". The "shop name" is a name of a shop, and the "position information" is GPS information (latitude and longitude) of a location of the shop. The "Ticket accept URL" is a URL when the shop server 20 accepts the ticket and is utilized as the transmission destination of the issued ticket. "The shop type" is information indicating a type of the shop.

In the shop server 20, when the communication processing unit 202 receives the ticket, the request analysis unit 204 extracts the received ticket and sends the ticket to the ticket management unit 216. The ticket management unit 216 saves and manages the ticket in the ticket DB 256.

In the above, although the ticket broker server 50 is described as a server different from the car rental company server 10 so as not to be dependent on the provided data, the car rental company server 10 may be integrated with the ticket broker server 50. For example, the ticket broker server 50 may be omitted, and the car rental company server 10 may be caused to have functions of the ticket broker server 50. By doing so, a range of use of the ticket is limited to the car rental company server 10, thus allowing for provision of more privacy-conscious services.

(Ticket Transmission (Processing of (1) to (5) of FIG. 9B))

Figure 19:
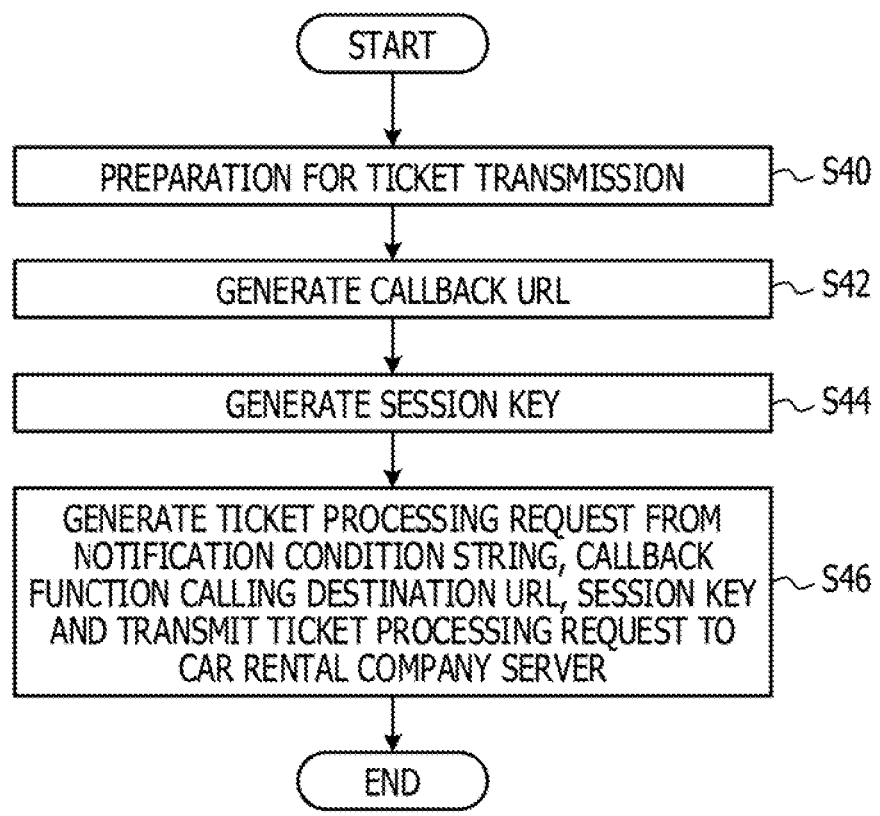
FIG. 19 is a flowchart illustrating processing by the shop server to return the ticket.

With reference to the flowchart of FIG. 19, description is given of processing by which the shop server 20 transmits the ticket to the car rental company server 10.

In the shop server 20 that receives the ticket from the ticket broker server 50, the request analysis unit 204 starts preparation for ticket transmission to the car rental company server 10 (S40).

The preparation for ticket transmission may start when an operator performs predetermined input on a management screen or may automatically start if a preset condition is satisfied after receipt of the ticket (if a predetermined period elapses, for example). When the preparation for ticket transmission starts, the request generation unit 212 requests the notification condition management unit 214 for processing to add a condition.

If the preparation for ticket transmission starts when the operator performs the input on the management screen, the notification condition management unit 214 displays on the management screen a screen for adding a condition to the ticket. The notification condition management unit 214 generates the notification condition string based on a value of the condition input by the operator and registers the notification condition string with the notification condition DB 254. If the preparation for ticket transmission automatically starts, the notification condition management unit 214 retrieves from the notification condition DB 254 the value of the condition preset by the operator on a setting screen and generates the notification condition string based on that value.

For example, the conditions that may be set for the access ticket of FIG. 12B are the distance to the destination (to_destination) and the level of acceleration or deceleration (acceleration_level). Thus, if the user wishes to be notified when the user comes 5 km short of the destination or the acceleration or the deceleration reaches a medium level, the notification condition management unit 214 generates the notification condition strings such as {"to_destination": {"distance":"5 km","from":"35.6684415¥,139.600784"}, "acceleration_level":"3"}. A value of "from" is the GPS position data (latitude and longitude) of the shop itself.

The notification condition management unit 214 requests the callback management unit 220 to generate a callback URL. The callback management unit 220, which receives the request, analyzes the acquired driving information. If the acquired driving information matches a preset condition, the callback management unit 220 generates a callback function to transmit a message and a calling destination URL of that callback function (S42).

FIG. 20 illustrates an example of the callback function to transmit a discount information message. In FIG. 20, the callback function calling destination URL is written in a parameter on a second line. The callback function of FIG. 20 is to analyze the driving information in the JSON format transmitted to the URL on the second line and to transmit from shop1 to the car rental company server 10 a request for transmission of a message "10% discount of exclusive lunch" if the driving information matches the notification condition. The message may be any information other than discount information, such as a message informing seat availability or the like, for example.

Although FIG. 20 illustrates the example in which the message to be transmitted is determined in advance, the message may be dynamically created when the driving information is received. In this case, the callback function may describe processing by which a notification screen is displayed on a terminal of the operator where the operator is caused to enter a message on the moment.

The notification condition management unit 214 requests the ticket management unit 216 to generate a session key (communication encryption key) to be utilized when data is replied by the ticket. The ticket management unit 216, which receives the request, generates the encryption key via the key management unit 218 and returns the encryption key to the notification condition management unit 214 (S44). The key management unit 218 stores the generated encryption key in the encryption key DB 258.

The notification condition management unit 214 returns to the request generation unit 212 the notification condition string that is generated earlier, the callback function calling destination URL, and the session key. In response, the request generation unit 212 generates and transmits the ticket processing request to the ticket processing accept API (http://rentacar.example.com/processTicket) of the car rental company server 10.

FIG. 21 illustrates an example of the ticket processing request. In the ticket processing request of FIG. 21, "ticket" contains a string obtained by base64-encoding the ticket, and "notify", "callback", and "sessionKey" each contain a value generated by the notification condition management unit 214.

Figure 22:
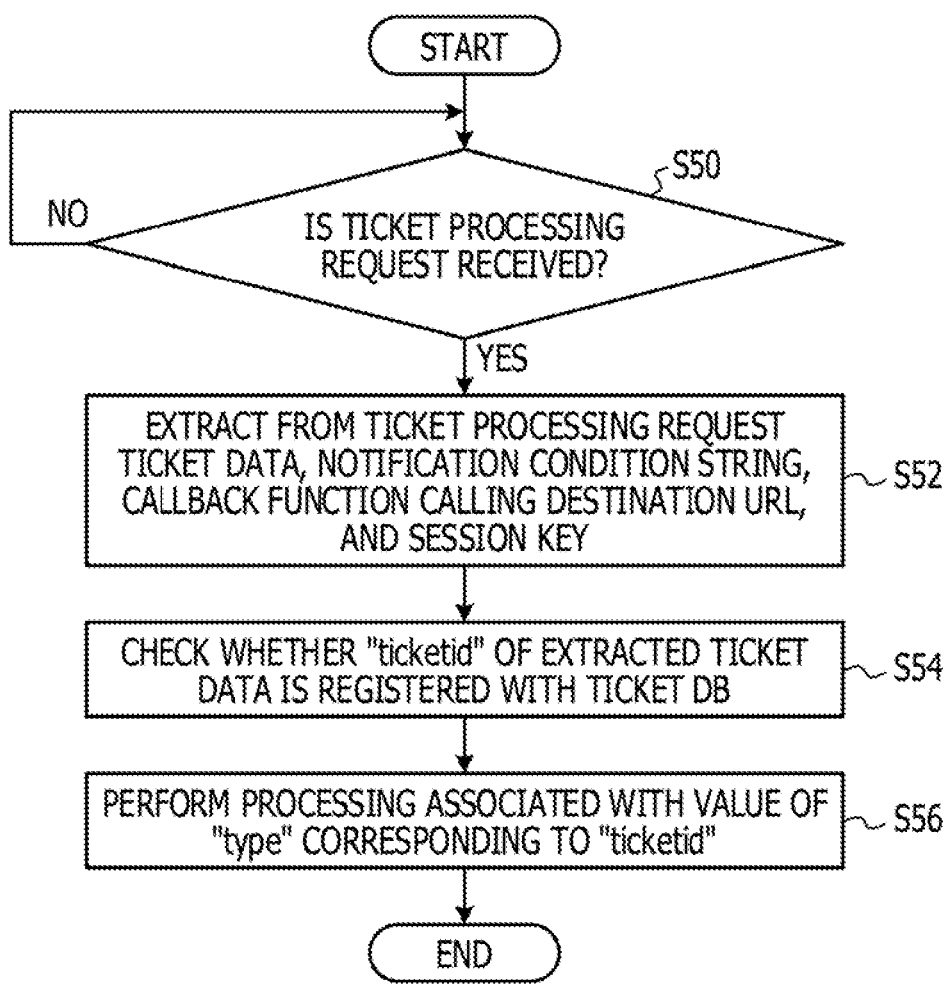
FIG. 22 is a flowchart illustrating processing of the car rental company server that receives the ticket processing request.

Hereinafter, with reference to the flowchart of FIG. 22, description is given of a processing procedure of the car rental company server 10 that receives the ticket processing request of FIG. 21.

In the car rental company server 10, when receiving the ticket processing request (550: Yes), the communication processing unit 102 transmits the received ticket processing request to the request analysis unit 104. The request analysis unit 104 extracts, from the ticket processing request, the ticket data, the notification condition string, the callback function calling destination URL, and the session key and passes the ticket data, the notification condition string, the call back function calling URL, and the session key to the ticket processing unit 108 (S52). The ticket processing unit 108 retrieves a value of "ticketid" from the decoded ticket data, passes the value to the ticket management unit 110, and confirms whether the ticket of the "ticketid" is registered with the ticket DB 152 (S54).

FIG. 23 illustrates an example of the ticket DB 152 managed by the ticket management unit 110. A "ticketid" field of the ticket DB 152 stores the ticket identification information, and an "issuer" field stores issuer identification information. A "type" field stores type information of the ticket, an "encryption key" field stores information on the encryption key, and a "hash value" field stores information on a hash value of the ticket. A "term of validity" field stores information on a date and time that are the term of validity of the ticket.

If the "tcketid" retrieved from the ticket processing request is present in the ticket DB 152, the ticket management unit 110 returns a value of the "type" corresponding to the "ticketid" to the ticket processing unit 108. The ticket processing unit 108 performs processing associated with the value of "type" (S56).

If the value of "type" is "plain", the ticket processing unit 108 sends payload of the ticket to the ticket management unit 110. At this time, the ticket management unit 110 decrypts the payload with the encryption key retrieved from the ticket DB 152 to execute a program of the ticket and returns an execution result to the ticket processing unit 108. The ticket processing unit 108 passes the received execution result to the transmission data generation unit 124. Subsequently, the transmission data generation unit 124 creates reply data including the execution result of the ticket and transmits the reply data to the shop server 20 via the communication processing unit 102.

If the value of "type" is "promise", the ticket processing unit 108 links the notification condition with the ticketid and passes the notification condition to the event monitoring unit 114, and transmits the callback destination (callback function calling destination URL) and the session key to the transmission destination management unit 126. In this case, the event monitoring unit 114 associates the notification condition with the ticketid and registers the notification condition in the notification condition DB 154. The transmission destination management unit 126 generates the notice object (object ID) and returns the object ID to the ticket processing unit 108 after linking the callback destination (callback function calling destination URL) and the session key and registering the callback destination and the session key with the notice object DB 166. As illustrated in FIG. 24, the notice object DB 166 stores the "object ID", the "callback URL" (callback function calling destination URL), and the "session key" that are associated with the "ticket ID". Subsequently, the ticket processing unit 108 transmits the object ID to the transmission data generation unit 124. The transmission data generation unit 124 creates reply data including the object ID (see FIG. 25). The ticket processing unit 108 transmits the reply data to the shop server 20 via the communication processing unit 102.

Hereinafter, description is given of processing of the shop server 20 that receives the reply data including the object ID from the car rental company server 10.

In the shop server 20, the communication processing unit 202, which receives the reply data (including the object ID) for the ticket processing request, passes the reply data to the request analysis unit 204.

The request analysis unit 204 extracts the object ID and the ticket ID from the reply data to link both, and requests the notice object management unit 210 to save the object ID and the ticket ID in the notice object DB 166. When saving the data in the notice object DB 166 and completing the processing, the notice object management unit 210 then enters a callback calling standby state.

(Ticket Contents Transmission (Processing of (6) to (7) of FIG. 98))

The vehicle-mounted device 30 processes information acquired by the sensors 188*a* to 188*d* into a form for transmission at the data transmission unit 304, and transmits the data regularly or real-time to the driving information reception accept API (http://rentacar.example.com/uploadDriveData) of the car rental company server 10. The driving information from the vehicle-mounted device 30 may be accumulated in a database operated by a manufacturer using a network dedicated to the manufacturer, without being transmitted via the network 80 such as the internet. In this case, the data may be acquired by the car rental company server 10 having access to the database of the manufacturer at a regular interval.

In the car rental company server 10, when receiving the driving information, the communication processing unit 102 transmits the driving information to the request analysis unit 104. The request analysis unit 104 transmits the driving information to the driving information management unit 118 and causes the driving information management unit 118 to store the driving information in the driving information DB 156.

Figure 26:
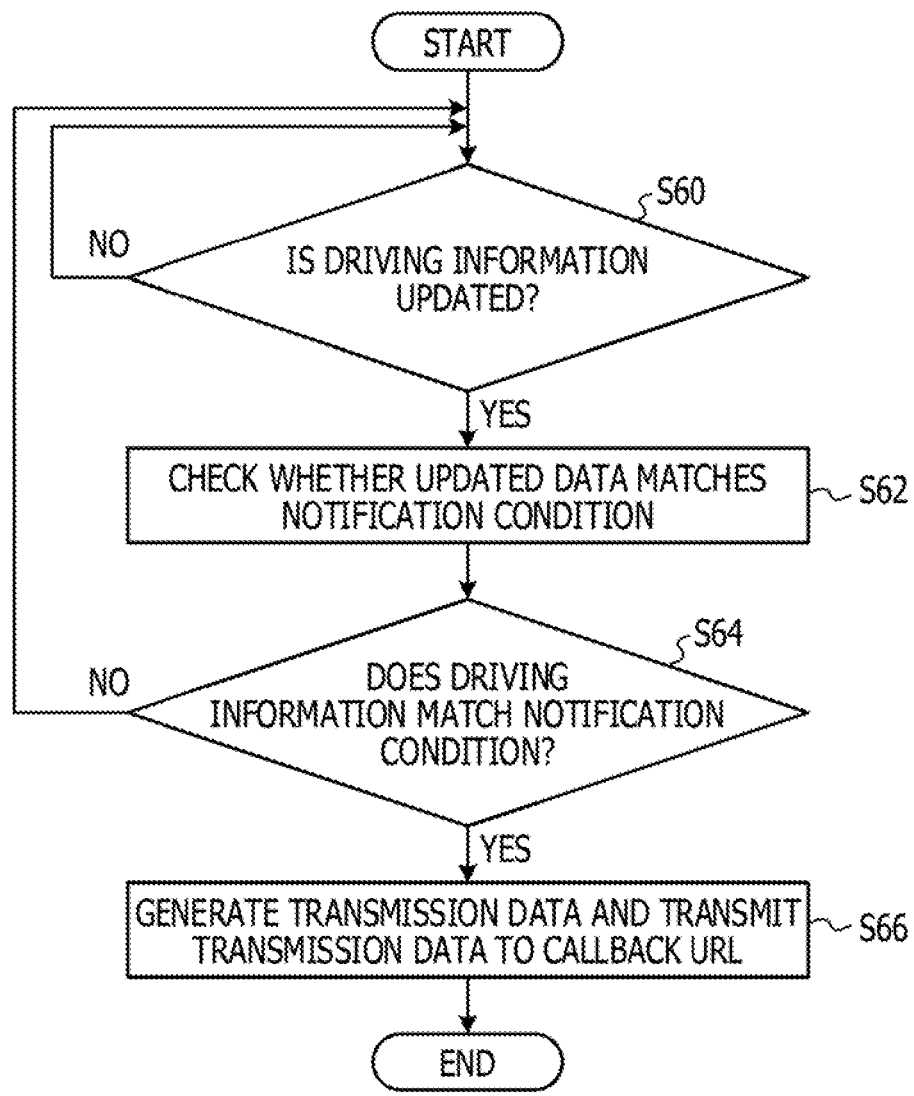
FIG. 26 is a flowchart illustrating driving information monitoring processing by the car rental company server.

FIG. 26 illustrates processing of monitoring the driving information by the car rental company server 10 in the flowchart.

As illustrated in FIG. 26, the event monitoring unit 114 monitors an update of the driving information DB 156 of the driving information management unit 118 at all times (S60).

In this case, the event monitoring unit 114 acquires from the ticket management unit 110 a ticket that desires access to car data being updated in the driving information DB 156 and executes a program of the ticket for the driving information DB 156.

The event monitoring unit 114 checks whether the data obtained from the driving information DB 156 by execution of the program of the ticket matches the notification condition of the ticket (S62). For example, suppose that the notification conditions are the notification condition {"to_destination":{"distance":"5 km","from": "35.6684415¥,139.600784"},"acceleration_level":"3"} illustrated in FIG. 21. In this case, the event monitoring unit 114 calculates the distance from the position data included in the driving information and the value of "from". If a result of the calculation is smaller than 5 km, the event monitoring unit 114 determines that the data matches the notification condition. If a range of fluctuation in the speed, the accelerator operation amount, and the brake operation amount including the driving information exceeds a certain numeric value for a certain number of times within a certain period of time (for example, which means that a rapid acceleration or deceleration operation frequently occurs, resulting in fatigue), the event monitoring unit 114 determines that the data matches the notification condition.

If the data matches the notification condition (S64: Yes), the event monitoring unit 114 transmits the driving information and the ticket ID to the transmission data generation unit 124. The transmission data generation unit 124 extracts notice object data corresponding to the notice ticket ID from the notice object DB 166 via the transmission destination management unit 126 and generates transmission data which is the driving information encrypted with the encryption key. Subsequently, the transmission data generation unit 124 transmits the generated transmission data to the callback function calling destination URL (callback URI) via the communication processing unit 102 (S66). If the determination of step S64 is denied, for example, if the transmission data does not match the notification condition, the event monitoring unit 114 returns to step S60.

Figure 27:
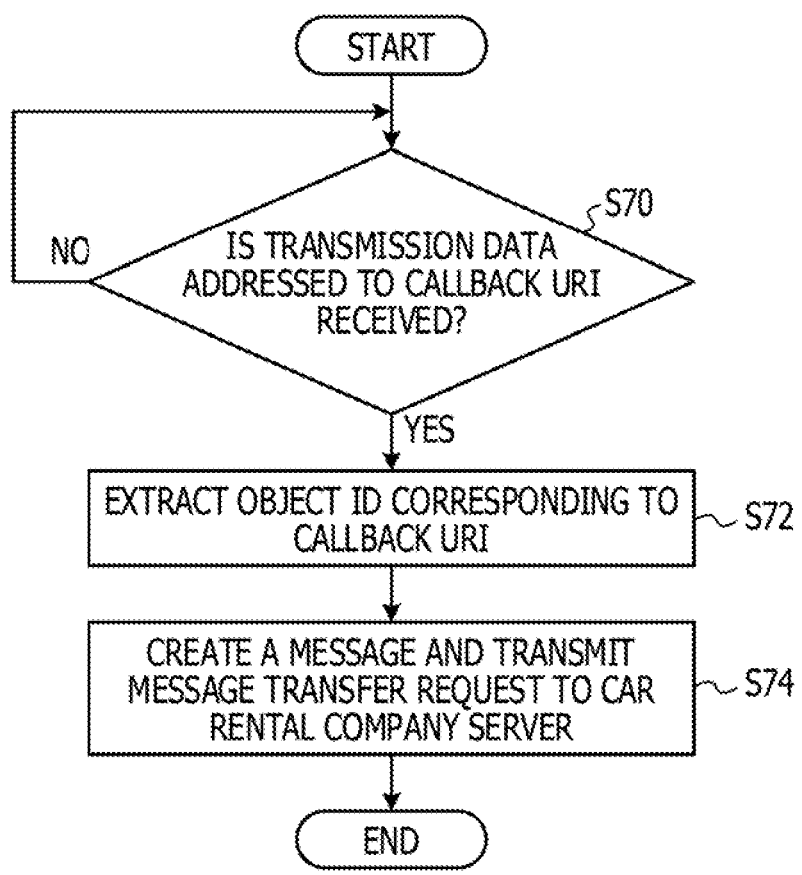
FIG. 27 is a flowchart illustrating processing of the shop server that receives data through a callback URI.

Hereinafter, with reference to the flowchart of FIG. 27, description is given of processing of the shop server 20 that receives the data at the callback URI.

In the shop server 20, when the communication processing unit 202 receives the transmission data addressed to the callback URI (S70: Yes), the communication processing unit 202 passes the transmission data to the request analysis unit 204. The request analysis unit 204 extracts the callback function corresponding to the callback URI from the callback function DB 260 managed by the callback management unit 220 and passes the processing to the notice data processing unit 208 together with the received data. The notice data processing unit 208 queries the notice object management unit 210 and extracts the object ID corresponding to the callback URI (S72).

Next, the notice data processing unit 208 passes to the key management unit 218 the ticket ID linked with the object ID to acquire an applicable encryption key and decrypts the received data. The notice data processing unit 208 passes the decrypted data and the object ID to the callback management unit 220 and performs execution.

If the case of the callback function of FIG. 20, since it is seen from the received driving data that the rental car is close to the shop, the callback management unit 220 creates the message of "10% discount of exclusive lunch". The callback management unit 220 transmits a message transfer request to the car rental company server 10 via the request generation unit 212 and the communication processing unit 202 (S74).

In the aforementioned example, although only a message text and a picture image displayed on the navigation screen are transmitted in the message transfer request, the message transfer request is not limited to this. For example, if it is desired to perform message transmission utilizing an access right to the navigation screen or the car information (current position or the like, for example), a ticket for message transfer (navigation display ticket) to access the database of the car rental company server 10 may be acquired in advance from the user and the ticket may be transmitted together. The ticket for message transfer may be acquired in advance from the user and saved in the shop server 20. A ticket may be created by embedding the ticket for message transfer in the first ticket for data acquisition, and the car rental company server 10 may transmit the ticket for message transfer together with the notice data.

(Message Display (Processing of (8) and (9) of FIG. 9B))

Hereinafter, processing of the car rental company server 10 in a case where the received message transfer request includes the navigation display ticket is set forth.

FIG. 28 is a diagram illustrating an example of the navigation display ticket. The navigation display ticket of FIG. 27 is a ticket to acquire the access right (cartoken) to perform display on the vehicle-mounted device 30 (navigation screen) of the rental car, and "payload" contains a program to acquire cartoken data of the rental car. Generation of this ticket is requested when the user who hires the rental car makes an application, and the ticket is passed to the shop server 20 in advance and transmitted from the shop server 20 together with the message transfer request.

When receiving the message transfer request, the communication processing unit 102 of the car rental company server 10 passes the message transfer request to the request analysis unit 104. The request analysis unit 104 extracts a message (postData) and the ticket from contents of the request and passes each of the data to the message processing unit 116 and the ticket processing unit 108. The message processing unit 116 generates a message text from the data of the message and sends the message text to the transmission data generation unit 124. With a procedure similar to the aforementioned ticket processing, the ticket processing unit 108 acquires the cartoken of the rental car from data in the car information DB 160 managed by the information management unit 120 and sends the cartoken to the transmission data generation unit 124. The transmission data generation unit 124 generates a message display request including the passed data and transmits the message display request to the message display accept API (http://car0001.example.com/displayMessage) of the vehicle-mounted device 30 via the communication processing unit 102.

Figure 29:
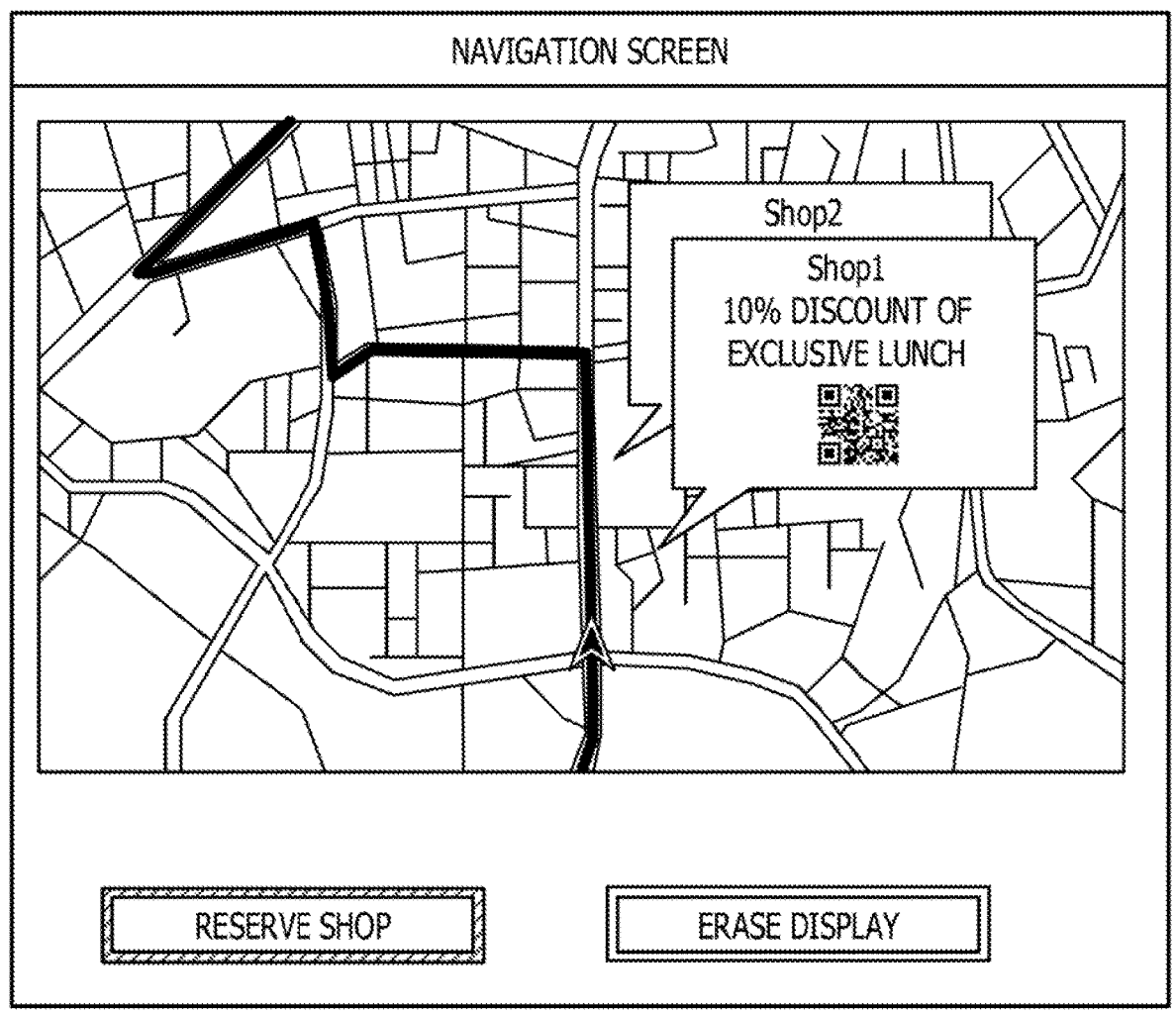
FIG. 29 is a diagram illustrating an example of a navigation screen.

The communication processing unit 302 of the vehicle-mounted device 30, which receives the message display request, passes contents of the request to the data processing unit 308. The data processing unit 308 extracts the cartoken and the message contents from the contents of the request, and displays the message contents on the screen display unit 310 when the data processing unit 308 verifies that the cartoken is correct. FIG. 29 is a display example of the message that corresponds to the discount information message of FIG. 20 and is displayed on the navigation screen. The transmitted message and a QR Cord® are displayed on a position of a shop on a map. Pressing "Reserve Shop"

button on the screen makes it possible to access a reservation site of the shop to make a reservation.

(Regarding Ticket Disappearance)

In the meantime, the ticket management unit 110 of the car rental company server 10 regularly checks contents of the ticket DB 152. If there is an entry the term of validity of which expires, the ticket management unit 110 deletes the entry. Therefore, if the ticket management unit 110 receives the ticket corresponding to the deleted entry, without performing the ticket processing, the ticket management unit 110 returns to the shop server 20 error information to the effect that ticket is invalid, because there is no applicable ticket in the ticket DB 152.

Figure 30B:
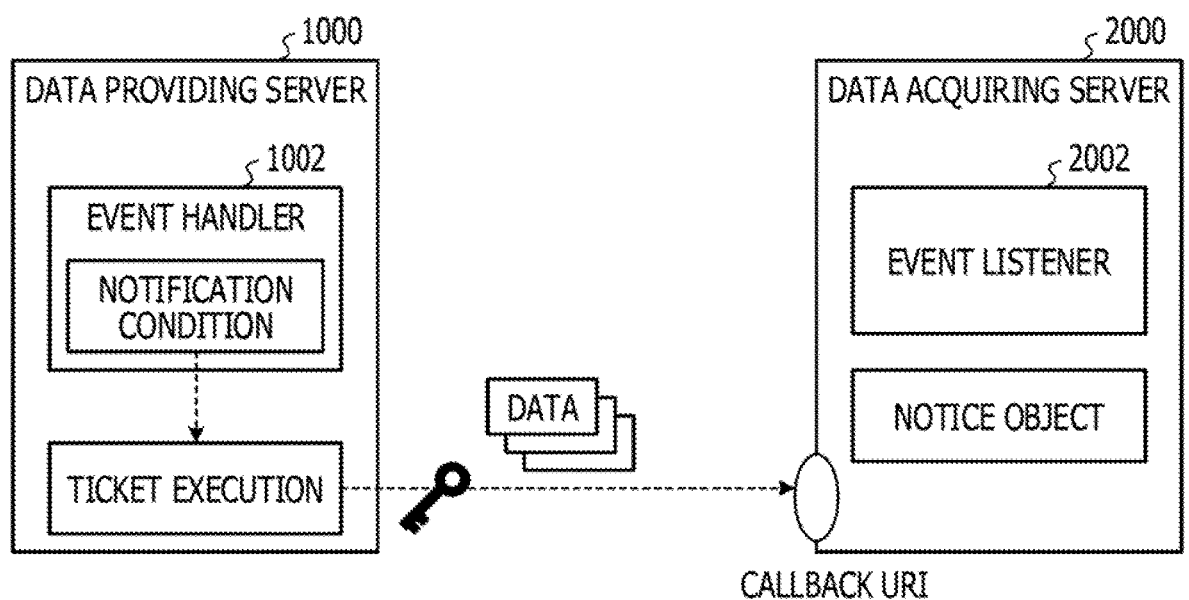

FIGS. 30A and 30B are diagrams schematically illustrating an overview of processing by a data providing server 1000 and a data acquiring server 2000, the overview being divided to two phases of a first phase and a second phase. The data providing server 1000 corresponds to the aforementioned car rental company server 10, and the data acquiring server 2000 corresponds to the aforementioned shop server 20.

In the first phase, as illustrated in FIG. 30A, the data acquiring server 2000 transmits to the data providing server 1000 the ticket processing request (data access parameter) including a data access ticket and a request parameter. The request parameter includes the aforementioned notification condition and notification means information (callback URI). The data providing server 1000 sets the received notification condition in an event hander 1002 (corresponding to the event monitoring unit 114 of FIG. 4). The notice object generation unit 1004 (corresponding to the transmission destination management unit 126 of FIG. 4) generates a notice object including the program corresponding to the callback URI and sends reply data including the generated notice object to the data acquiring server 2000. The data acquiring server 2000 sets the notice object for accepting a notice in an event listener 2002 (corresponding to the notice object management unit 210 of FIG. 5).

In the second phase, as illustrated in FIG. 308, if the event handler 1002 of the data providing server 1000 detects that the notification condition is met, the event handler 1002 executes the program of the ticket and acquires the data. The data providing server 1000 transmits the acquired data by accessing notification means (callback URI) provided by the data acquiring server 2000. At this time, the data providing server 1000 transmits the data with the session key included in the ticket. After verifying that the session key is correct, the data acquiring server 2000 sets the data in the notice object. If the event listener 2002 of the data acquiring server 2000 senses that there is the notice, the event listener 2002 acquires the data from the notice object The second phase continues the processing till a preset deadline or till an end condition is established.

Doing as illustrated in FIGS. 30A and 30B makes it possible to receive data asynchronously in one approval process because the notification processing is included in the approval procedure of the ticket. Allowing only the data providing server 1000 to access the callback URI assures safety of notification.

Inclusion of a parameter processing program in a ticket precludes falsification of association of a ticket and a parameter.

As obvious from the description so far, in the present embodiment, is provided a function as a reply unit that sends the reply data including the notice object to the shop server 20, including the transmission destination management unit 126 and the transmission data generation unit 124. In the present embodiment, is provided a function as a transmission unit that transmits the driving information to the shop server 20 when the notification condition is satisfied, including the event monitoring unit 114 and the transmission data generation unit 124.

As described above in detail, according to the present embodiment, the communication processing unit 102 of the car rental company server 10 receives from the shop server 20 the ticket processing request that includes the access ticket of the data use of which by others is agreed by the user, the notification condition, and the callback URI. The transmission destination management unit 126 generates the notice object corresponding to the callback URI, and the transmission data generation unit 124 transmits the reply data including the notice object to the shop server 20. Under the supervision of the event monitoring unit 114, when the driving information satisfies the notification condition, the transmission data generation unit 124 generates the transmission data including the driving information that satisfies the notification condition, and transmits the transmission data to the callback URI of the shop server 20 via the communication processing unit 102. In the present embodiment, this makes it possible to transmit the transmission data to the shop server 20 at an appropriate timing that satisfies the notification condition, once the ticket processing request is received from the shop server 20. Since only the car rental company server 10 is notified of the callback URI, the safety of the transmission data may be secured.

Therefore, the shop server 20 may transmit information that guides the user to the shop (information that promotes buying intention), to the vehicle-mounted device 30 utilized by the user at the timing that satisfies the notification condition. With this, useful information of the shop may be provided to the user at the appropriate timing. Since a potential for the user to visit the shop is increased, this is beneficial to the shop. For example, appropriate recommendation tailored to the user's condition is possible and may improve precision of matching of the user and the shop. The car rental company may obtain a margin (handling charge) from the shop by providing the shop with the driving information.

In the present embodiment, the ticket processing request includes the encryption key (session key), and the transmission data generation unit 124 transmits to the shop server 20 the driving information encrypted with the encryption key and included in the transmission data (S66). This makes it possible to keep the driving information secret.

The event monitoring unit 114 monitors whether or not the driving information satisfies the notification condition, till the term of validity ends or the predefined end condition is satisfied. This allows for provision of the driving information desirable for the shop in a predefined range.

Although in the aforementioned embodiment, description is given of the case where the data access control system is utilized between three parties of the car rental company, the shop, and the user, the case is not limited to this. As far as the three parties are in a relationship of those who provide information, those who collect information, and those who provide another information to those who provide the information using the collected information, a job type, a business type, or the like do not matter.

The aforementioned processing functions may be realized by a computer. In that case, there is provided a program that describes processing contents of a function which a processing device is to have. The aforementioned processing functions are realized in the computer when the computer executes the program. The program that describes the processing contents may be recorded in a computer-readable storage medium (except for a carrier wave).

To distribute a program, a portable storage medium such as a digital versatile disc (DVD), a compact disc read-only memory (CD-ROM), or the like storing the program is marketed, for example. The program may be stored in a storage device of a server computer and transferred from the server computer to another computer through a network.

For example, the computer executing the program stores the program recorded in the portable storage medium or the program transferred from the server computer in its own storage device. The computer reads the program from its own storage device and executes processes in accordance with the program. The computer may read the program directly from the portable storage medium and execute the processes in accordance with the program. Every time the program is transferred from the server computer, the computer may sequentially execute the processes in accordance with the program.

The aforementioned embodiments are examples of a preferred embodiment. The embodiments are not limited thereto, and various modifications may be made without departing from the spirit of the present disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An apparatus comprising:
a memory storing instructions; and
a processor coupled to the memory and configured to execute the instructions to:
receive data access parameters from an external device of a transmission destination, the data access parameters including an access ticket, a transmission condition to transmit data, and information on the transmission destination of the data, the access ticket including a first program accessible to the data whose utilization by others is authorized by a user;
generate a notice object corresponding to the information on the transmission destination;
transmit the notice object to the transmission destination;
execute the first program of the access ticket to acquire the data when the transmission condition is satisfied; and
transmit the acquired data to the transmission destination to set the acquired data in the notice object.

2. The apparatus of claim 1, wherein the data access parameters are included within a ticket issuing request and further include a credential of the user and data type requested.

3. The apparatus of claim 2, wherein the data type is at least one of a first type requesting the data from the transmission destination, a second type in which a notification is generated in which the data will be provided when the transmission condition is satisfied, and a third type in a ticket is generated.

4. The apparatus of claim 1, wherein:
the data access parameters further include an encryption key; and
the processor is further configured to encrypt the acquired data with the encryption key and transmit the encrypted data.

5. The apparatus of claim 1, wherein the processor repeatedly determines whether or not the transmission condition is satisfied until a predetermined end condition is satisfied.

6. The apparatus of claim 5, wherein the predetermined end condition is a time duration from generation of the notice object.

7. The apparatus of claim 1, wherein:
the processor is configured to provide a device utilized by the user with information regarding the external device in accordance with a request from the external device that has received the data.

8. The apparatus of claim 7, wherein:
the data is data regarding driving of a car utilized by the user; and
the external device is an information processor of a shop identified based on a route on which the car is scheduled to drive.

9. The apparatus of claim 1, wherein the data is data regarding driving of a case and is obtained from at least one of position sensor, speed sensor, or acceleration sensor of the car, and the transmission condition relates to one of distance from a location, speed and acceleration of the car.

10. A non-transitory, computer-readable recording medium having stored therein a program for causing a computer to execute a process comprising:
receiving data access parameters from an external device of a transmission destination, the data access parameters including an access ticket, a transmission condition to transmit data, and information on the transmission destination of the data, the access ticket including a first program accessible to the data whose utilization by others is authorized by a user;
generating a notice object corresponding to the information on the transmission destination;
transmitting the notice object to the transmission destination;
executing the first program of the access ticket to acquire the data when the transmission condition is satisfied; and
transmitting the acquired data to the transmission destination to set the acquired data in the notice object.

11. The non-transitory, computer-readable recording medium of claim 10, wherein:
the data access parameters further include an encryption key; and
the process further comprises
encrypting the acquired data with the encryption key and transmitting the encrypted data.

12. The non-transitory, computer-readable recording medium of claim 10, the process further comprising:
repeatedly determining whether the transmission condition is satisfied until a predetermined end condition is satisfied.

13. The non-transitory, computer-readable recording medium of claim 10, the process further comprising:
providing a device utilized by the user with information regarding the external device in accordance with a request from the external device that has received the data.

14. A system comprising:
an information processing device including a first processor; and an external device including a second processor, wherein:

the first processor and the second processor are configured to control access to data whose utilization by others is authorized by a user of the information processing device; and the first processor is configured to:

receive data access parameters from a transmission destination of the external device, the data access parameters including an access ticket, a transmission condition to transmit the data, and information on the transmission destination of the data, the access ticket includes a program accessible to data utilization by others, which is authorized by a user, generate a notice object corresponding to the information on the transmission destination;

transmit the notice object to the transmission destination;

execute the program of the access ticket to acquire the data when the transmission condition is satisfied; and transmit the acquired data to the transmission destination to set the acquired data in the notice object.

15. The system of claim 14, wherein:

the data access parameters further include an encryption key; and the first processor is further configured to encrypt the acquired data with the encryption key and transmit the encrypted data.

16. The system of claim 14, wherein the first processor repeatedly determines whether the transmission condition is satisfied until a predetermined end condition is satisfied.

17. The system of claim 14, wherein:

the first processor is configured to provide a device utilized by the user with information regarding the external device in accordance with a request from the external device that has received the data.

18. The system of claim 17, wherein:

the data is data regarding driving of a car utilized by the user; and the external device is an information processor of a shop identified based on a route on which the car is scheduled to drive.

19. The system of claim 17, further comprising:

a mediation device including a third processor configured to:

acquire an access ticket from a user terminal having the access ticket that has been issued by the information processing device, and transfer the access ticket to the external device.

* * * * *